(12) United States Patent
Liu

(10) Patent No.: US 12,452,101 B2
(45) Date of Patent: Oct. 21, 2025

(54) PACKET DETECTION METHOD, CONNECTIVITY NEGOTIATION RELATIONSHIP ESTABLISHMENT METHOD, AND RELATED DEVICE

(71) Applicant: Huawei Technologies Co., Ltd., Shenzhen (CN)

(72) Inventor: Guoliang Liu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 817 days.

(21) Appl. No.: 17/723,985

(22) Filed: Apr. 19, 2022

(65) Prior Publication Data

US 2022/0247598 A1 Aug. 4, 2022

Related U.S. Application Data

(63) Continuation of application No. PCT/CN2020/118204, filed on Sep. 27, 2020.

(30) Foreign Application Priority Data

Oct. 22, 2019 (CN) .......................... 201911007534.6

(51) Int. Cl.
*H04L 45/02* (2022.01)
*H04L 12/46* (2006.01)
(Continued)

(52) U.S. Cl.
CPC ...... *H04L 12/4633* (2013.01); *H04L 12/4641* (2013.01); *H04L 45/02* (2013.01); *H04L 45/22* (2013.01); *H04L 45/745* (2013.01)

(58) Field of Classification Search
CPC . H04L 12/4633; H04L 12/4641; H04L 45/02; H04L 45/22; H04L 45/745
(Continued)

(56) References Cited

U.S. PATENT DOCUMENTS 9,794,180 B2* 10/2017 Thoria .................... H04L 45/32
9,948,472 B2* 4/2018 Drake ..................... H04L 12/18
(Continued)

FOREIGN PATENT DOCUMENTS

CN 102143019 A 8/2011
CN 106330605 A 1/2017
(Continued)

OTHER PUBLICATIONS

Bradner et al. "RFC 2544: Benchmarking Methodology for Network Interconnect Devices", 1999, pp. 1-31.*

*Primary Examiner* — Anthony Mejia
(74) *Attorney, Agent, or Firm* — Conley Rose, P.C.

(57) ABSTRACT

A packet detection method includes a first provider edge (PE) that sends a detection packet to a second PE, where the detection packet is used to enable the second PE to generate a response packet, and the detection packet includes a bypass virtual extensible local area network (VXLAN) tunnel source Internet Protocol (IP) address; the first PE receives, through a bypass VXLAN tunnel, a response packet for the detection packet, where the response packet includes the bypass VXLAN tunnel source IP address; and the first PE obtains a detection result from the response packet. The first PE may receive the response packet, so that the first PE can obtain the detection result.

19 Claims, 14 Drawing Sheets

(51) Int. Cl.
    *H04L 45/00*     (2022.01)
    *H04L 45/745*    (2022.01)
(58) Field of Classification Search
    USPC ......................................................... 370/392
    See application file for complete search history.

(56) References Cited

U.S. PATENT DOCUMENTS

| | | | |
|---|---|---|---|
| 10,225,104 B2* | 3/2019 | Guichard | H04L 12/4641 |
| 10,320,658 B2* | 6/2019 | Sajassi | H04L 45/28 |
| 11,374,862 B2* | 6/2022 | Wang | H04L 12/4633 |
| 11,689,388 B2* | 6/2023 | Hu | H04L 63/1408 |
| | | | 726/22 |
| 2014/0160942 A1 | 6/2014 | Mandavilli et al. | |
| 2014/0348166 A1 | 11/2014 | Yang et al. | |
| 2016/0149808 A1 | 5/2016 | Cai et al. | |
| 2016/0330074 A1* | 11/2016 | Cook | H04L 67/10 |
| 2017/0288948 A1* | 10/2017 | Singh | H04L 41/0668 |
| 2018/0013687 A1* | 1/2018 | Jin | H04L 47/36 |
| 2018/0109436 A1* | 4/2018 | Sajassi | H04L 41/12 |
| 2019/0222431 A1 | 7/2019 | Gao et al. | |
| 2019/0296966 A1 | 9/2019 | Gao et al. | |
| 2020/0244485 A1 | 7/2020 | Gao et al. | |

FOREIGN PATENT DOCUMENTS

| | | |
|---|---|---|
| CN | 108259291 A | 7/2018 |
| CN | 108574614 A | 9/2018 |
| CN | 108696416 A | 10/2018 |
| CN | 109672619 A | 4/2019 |
| EP | 3451593 A1 | 3/2019 |
| WO | 2018109536 A1 | 6/2018 |

\* cited by examiner

PACKET DETECTION METHOD, CONNECTIVITY NEGOTIATION RELATIONSHIP ESTABLISHMENT METHOD, AND RELATED DEVICE

CROSS-REFERENCE TO RELATED APPLICATIONS

This application is a continuation application of International Patent Application No. PCT/CN2020/118204, filed on Sep. 27, 2020, which claims priority to Chinese Patent Application No. 201911007534.6, filed on Oct. 22, 2019. The disclosures of the aforementioned applications are hereby incorporated by reference in their entireties.

TECHNICAL FIELD

Embodiments of this application relate to the communications field, and in particular, to a packet detection method, a connectivity negotiation relationship establishment method, and a related device.

BACKGROUND

An Ethernet virtual private network (EVPN) is a layer 2 virtual private network (VPN) technology. A control plane notifies EVPN routing information based on a Multiprotocol Border Gateway Protocol (MP-BGP). A data plane forwards a packet in a virtual extensible local area network (VXLAN) encapsulation manner.

In an anycast dual-homing active-active access scenario, a first customer edge (CE) is dual-homed to a first provider edge (PE) and a third PE, a VXLAN tunnel is established between the first PE and a second PE and between the third PE and the second PE, and a second CE is single-homed to the second PE. When the first PE executes a detection command, a source address carried in the detection command is an Internet Protocol (IP) address of the first CE, and a destination IP address is an IP address of the second CE, the first PE creates a detection packet based on the detection command, and the first PE sends the detection packet to the second PE. After the second PE receives the detection packet, if the second PE finds that a destination IP address is the same as the IP address of the second CE, the second PE returns a response packet. A source address in the response packet is the IP address of the second CE, and the destination IP address is the IP address of the first CE.

Because the first CE accesses both the first PE and the third PE, in an anycast case, the second PE may send the response packet to the first PE, or may send the response packet to the third PE. If the third PE receives the response packet, the third PE determines that the destination IP address in the response packet is the IP address of the first CE. However, because the third PE is not an initiator of the detection packet, detection failure is caused.

SUMMARY

Embodiments of this application provide a packet detection method, a connectivity negotiation relationship establishment method, and a related device, so that the first PE can obtain a detection result.

A first aspect of embodiments of this application provides a packet detection method, including the following.

A first PE executes a detection command that carries a first source IP address that is an IP address of a first CE, a first destination IP address that is an IP address of a second CE, and a VPN instance. The first PE creates a detection packet based on the detection command, and sends the detection packet to a second PE. The detection packet is used to enable the second PE to generate a response packet, and the detection packet and the response packet each include a bypass virtual extensible local area network bypass VXLAN tunnel source IP address. A bypass VXLAN tunnel is established between the first PE and a third PE. Therefore, after the second PE generates the response packet based on the detection packet sent by the first PE, the first PE may receive, through the bypass VXLAN tunnel, a response packet sent by the third PE. A second source IP address in the response packet is the IP address of the second CE, and a second destination IP address is the IP address of the first CE. After the first PE receives the response packet sent by the third PE, the first PE may obtain content of the response packet only by removing a VXLAN header of the response packet. The first PE obtains a detection result based on the content of the response packet.

In embodiments of this application, the first PE sends the detection packet to the second PE. The detection packet is used to enable the second PE to generate the response packet, and the response packet includes the bypass VXLAN tunnel source IP address. Therefore, when the third PE receives the response packet and sends the response packet to the first PE based on the bypass VXLAN tunnel source IP address, the first PE may receive, through the bypass VXLAN tunnel, the response packet that is sent by the third PE. Therefore, the first PE may obtain the detection result based on the response packet.

In a possible design, in a first implementation of the first aspect of embodiments of this application, the first PE determines the first PE as a destination receiver of the response packet; and when determining the first PE as the receiver of the response packet, the first PE obtains the detection result from the response packet.

In embodiments of this application, before the first PE obtains the detection result from the response packet, the first PE determines the first PE as the destination receiver of the response packet. The first PE needs to obtain the detection result from the response packet only when the first PE is the destination receiver of the response packet, to avoid obtaining the detection result from the response packet when the first PE is not the destination receiver of the response packet.

In a possible design, in a second implementation of the first aspect of embodiments of this application, the first PE is determined as the destination receiver of the response packet based on the bypass VXLAN tunnel source IP address in the response packet; or the first PE is determined as the destination receiver of the response packet based on the second destination IP address in the response packet. The second destination IP address is an IP address of a first customer edge CE.

Embodiments of this application provide two methods for determining the first PE as the destination receiver of the response packet. The first method is based on the bypass VXLAN tunnel source IP address in the response packet. If the response packet includes the bypass VXLAN tunnel source IP address, and the first PE is an initiator of the detection packet corresponding to the response packet, the first PE may determine the first PE as the destination receiver of the response packet. The second method is based on the second destination IP address in the response packet. If the second destination IP address included in the response packet is the IP address of the first CE, and the first PE is an initiator of the detection packet corresponding to the response packet, the first PE may determine the first PE as the destination receiver of the response packet. When the first method is used, a function of the bypass VXLAN tunnel source IP address is to enable the third PE to send the response packet to the first PE. Herein, the bypass VXLAN tunnel source IP address is used again, and data utilization is increased. When the second method is used, the first PE determines the first PE as the destination receiver of the response packet without changing a manner in which the first PE determines the detection result, to reduce a data modification amount.

A second aspect of embodiments of this application provides a connectivity negotiation relationship establishment method, including the following.

A first PE is provided with a first enabling switch, the first PE sets a state of the first enabling switch to a first state, the first state is usually an on state, and a bypass VXLAN tunnel is established between the first PE and a third PE. Because a bypass VXLAN tunnel is established between the first PE and the third PE, the first PE may obtain an address of the third PE, the first PE sets a value of a C bit of an active-active extended community attribute based on the first state, and then the first PE sends a route and the C bit to the third PE based on the address.

In embodiments of this application, the first PE sends the route and the C bit to the third PE, to establish a connectivity negotiation relationship, and a bypass virtual extensible local area network bypass VXLAN tunnel is established between the first PE and the third PE. However, in some cases, an information exchange between the first PE and the third PE is not smooth. According to the connection negotiation relationship establishment method in embodiments of this application, the information exchange between the first PE and the third PE can be enhanced.

In a possible design, in a first implementation of the second aspect of embodiments of this application, when the bypass VXLAN tunnel between the first PE and the third PE is a bypass layer 3 VXLAN tunnel, a method for establishing the connectivity negotiation relationship between the first PE and the third PE is that the first PE sends a type 5 route and the C bit to the third PE. An IP address that is of the first PE and that is carried in the type 5 route is 0.

In embodiments of this application, when the bypass VXLAN tunnel is a bypass layer 3 VXLAN tunnel, the first PE sends the type 5 route and the C bit to the third PE, to establish the connectivity negotiation relationship, and the IP address that is of the first PE and that is carried in the type 5 route is 0. Because the IP address of the first PE in the type 5 route occupies a large amount of data, and in the first implementation of the second aspect of embodiments of this application, the data is not effective, but needs to exist due to a format requirement, the IP address of the first PE in the type 5 route may be set to 0, to reduce a data transmission amount.

In a possible design, in a second implementation of the second aspect of embodiments of this application, when the bypass VXLAN tunnel between the first PE and the third PE is a bypass layer 2 VXLAN tunnel, a method for establishing the connectivity negotiation relationship between the first PE and the third PE is that the first PE sends a type 3 route and the C bit to the third PE.

In embodiments of this application, when the bypass VXLAN tunnel is a bypass layer 2 VXLAN tunnel, the first PE sends the type 3 route and the C bit to the third PE, to establish the connectivity negotiation relationship. The type 3 route has smaller data than a type 2 route. Therefore, a data transmission amount can be reduced.

A third aspect of embodiments of this application provides a packet detection method, including the following.

A second PE receives a detection packet sent by a first PE. The detection packet carries a first source IP address, a first destination IP address, and a bypass VXLAN tunnel source IP address, the first source IP address is an IP address of a first CE, the first destination IP address is an IP address of a second CE, and the bypass VXLAN tunnel source IP address is an IP address of a first PE end in two ends of a bypass VXLAN tunnel between the first PE and a third PE. The second PE generates a response packet based on the detection packet, and the second PE copies the bypass VXLAN tunnel source IP address in the detection packet into the response packet. The response packet carries a second source IP address, a second destination IP address, and the bypass VXLAN tunnel source IP address, the second source IP address is the IP address of the second CE, and the second destination IP address is the IP address of the first CE. The second PE sends the response packet through a VXLAN tunnel.

In embodiments of this application, the second PE receives the detection packet sent by the first PE. The detection packet includes the bypass VXLAN tunnel source IP address. The second PE generates the response packet based on the detection packet. The response packet includes the bypass VXLAN tunnel source IP address. The second PE sends the response packet. Therefore, when another PE receives the response packet and sends the response packet to the first PE based on the bypass VXLAN tunnel source IP address, the first PE may receive, through the bypass VXLAN tunnel, the response packet that is sent by the third PE. Therefore, the first PE may obtain a detection result based on the response packet.

In a possible design, in a first implementation of the third aspect of embodiments of this application, the second PE sends the response packet to the first PE or the third PE based on an anycast mechanism.

In embodiments of this application, in an anycast case, the second PE sends the response packet to a closest target, and the second PE considers that the closest target is the first PE or the third PE. Therefore, the second PE may send the response packet to the first PE or the third PE. Regardless of whether the second PE sends the response packet to the first PE or the third PE, the first PE can finally receive the response packet. Therefore, without a need for an accurate address of a destination receiver, the second PE can enable the destination receiver to receive the response packet.

In a possible design, in a second implementation of the third aspect of embodiments of this application, the detection packet and the response packet each are a VXLAN packet.

In embodiments of this application, the detection packet and the response packet each are a VXLAN packet. Therefore, a VXLAN tunnel is established between the second PE and the first PE and between the second PE and the third PE. The first PE, the second PE, and the third PE each are a node in a VXLAN network. The VXLAN network is highly scalable.

In a possible design, in a third implementation of the third aspect of embodiments of this application, the detection packet includes the first source IP address and the first destination IP address, the first source IP address is the IP address of the first customer edge CE, the first destination IP address is the IP address of the second CE, the response packet includes the second source IP address and the second destination IP address, the second source IP address is the IP address of the second CE, and the second destination IP address is the IP address of the first CE.

In embodiments of this application, the detection packet includes the first source IP address and the first destination IP address, the first source IP address is the IP address of the first customer edge CE, the first destination IP address is the IP address of the second CE, the response packet includes the second source IP address and the second destination IP address, the second source IP address is the IP address of the second CE, the second destination IP address is the IP address of the first CE, and the source IP address and the destination IP address in the detection packet are converted, to help the second PE forward the response packet.

A fourth aspect of embodiments of this application provides a packet detection method, including the following.

A third PE receives a response packet sent by a second PE; and when it is determined that a destination receiver of the response packet is a device different from the third PE, the third PE sends the response packet to N other PEs through N bypass virtual extensible local area network bypass VXLAN tunnels, where N is an integer greater than or equal to 1.

In embodiments of this application, the third PE receives the response packet sent by the second PE. Although a second destination IP address in the response packet is an IP address of a first CE, and a communication connection is established between the first CE and the third PE, the third PE is not an initiator of a detection packet, and the third PE needs to discard the response packet, but the third PE does not discard the response packet, and instead, sends the response packet to another PE that establishes a bypass VXLAN tunnel to the third PE. When the N other PEs establish a bypass VXLAN tunnel to the third PE, the third PE sends the response packet to the N other PEs through the N bypass VXLAN tunnels. Because a bypass VXLAN tunnel is established between the first PE and the third PE, the response packet may be used by the first PE to obtain a detection result.

A fifth aspect of embodiments of this application provides a packet detection method, including the following.

A third PE receives a response packet sent by a second PE. The response packet carries a bypass VXLAN tunnel source IP address, and the bypass VXLAN tunnel source IP address is an IP address of a first PE end in two ends of a bypass VXLAN tunnel between a first PE and the third PE. The third PE determines the bypass VXLAN tunnel based on a bypass VXLAN tunnel IP address. The third PE sends the response packet to the first PE through the bypass VXLAN tunnel. The response packet is used by the first PE to obtain a detection result.

In embodiments of this application, the third PE receives the response packet sent by the second PE, but the third PE is not a destination receiver of the response packet. The third PE needs to discard the response packet, but the third PE does not discard the response packet, and instead, determines the bypass VXLAN tunnel based on the bypass VXLAN tunnel IP address in the response packet, and then sends the response packet to the first PE through the bypass VXLAN tunnel. Because the response packet carries the bypass VXLAN tunnel IP address, and a bypass VXLAN tunnel is established between the first PE and the third PE, the third PE may send the response packet to the first PE. Therefore, the response packet may be used by the first PE to obtain the detection result.

In a possible design, in a first implementation of the fifth aspect of embodiments of this application, the response packet includes a second destination IP address, the second destination IP address is used by the first PE to determine the detection result, and the second destination IP address is an IP address of a first CE.

In embodiments of this application, the response packet includes the second destination IP address, and the second destination IP address is the IP address of the first CE. Because the first CE establishes a communication connection to the first PE, it may be more convenient that the first PE determines the detection result based on the second destination IP address.

In a possible design, in a second implementation of the fifth aspect of embodiments of this application, the bypass VXLAN tunnel IP address is used by the first PE to determine the detection result.

In embodiments of this application, the bypass VXLAN tunnel IP address may not only be used by the third PE to determine the bypass VXLAN tunnel, but also may be used by the first PE to determine the detection result, to improve data utilization, and add a new manner in which the first PE determines the detection result.

A sixth aspect of embodiments of this application provides a connectivity negotiation relationship establishment method, including the following.

A third PE sets a state of a second enabling switch to a first state. A bypass VXLAN tunnel is established between the third PE and a first PE. The third PE receives a route and a C bit of an active-active extended community attribute that are sent by the first PE. If the state of the second enabling switch is the first state, the route matches a target route of the third PE, and a value of the C bit is set, the third PE determines that a connectivity negotiation relationship is successfully established.

In embodiments of this application, the third PE receives the route and the C bit that are sent by the first PE, to establish the connectivity negotiation relationship, and a bypass virtual extensible local area network bypass VXLAN tunnel is established between the third PE and the first PE. However, in some cases, an information exchange between the first PE and the third PE is not smooth. According to the connection negotiation relationship establishment method in embodiments of this application, the information exchange between the first PE and the third PE can be enhanced.

In a possible design, in a first implementation of the sixth aspect of embodiments of this application, when the bypass VXLAN tunnel between the first PE and the third PE is a bypass layer 3 VXLAN tunnel, a method for establishing the connectivity negotiation relationship between the first PE and the third PE is that the third PE receives a type 5 route and the C bit that are sent by the first PE. An IP address that is of the first PE and that is carried in the type 5 route is 0.

In embodiments of this application, when the bypass VXLAN tunnel is a bypass layer 3 VXLAN tunnel, the first PE sends the type 5 route and the C bit to the third PE, to establish the connectivity negotiation relationship, and the IP address that is of the first PE and that is carried in the type 5 route is 0. Because the IP address of the first PE in the type 5 route occupies a large amount of data, and in the first implementation of the second aspect of embodiments of this application, the data is not effective, but needs to exist due to a format requirement, the IP address of the first PE in the type 5 route may be set to 0, to reduce a data transmission amount.

In a possible design, in a second implementation of the sixth aspect of embodiments of this application, when the bypass VXLAN tunnel between the first PE and the third PE is a bypass layer 2 VXLAN tunnel, a method for establishing the connectivity negotiation relationship between the third PE and the first PE is that the third PE receives a type 3 route and the C bit that are sent by the first PE.

In embodiments of this application, when the bypass VXLAN tunnel is a bypass layer 2 VXLAN tunnel, the first PE sends the type 3 route and the C bit to the third PE, to establish the connectivity negotiation relationship. The type 3 route has smaller data than a type 2 route. Therefore, a data transmission amount can be reduced.

A seventh aspect of embodiments of this application provides a packet detection apparatus, including a sending unit configured to send a detection packet to a second PE, where the detection packet is used to enable the second PE to generate a response packet, and the detection packet includes a bypass VXLAN tunnel source IP address; a receiving unit configured to receive, through a bypass VXLAN tunnel, a response packet for the detection packet, where the response packet includes the bypass VXLAN tunnel source IP address; and an obtaining unit configured to obtain a detection result from the response packet.

In a possible design, in a first implementation of the seventh aspect of embodiments of this application, the apparatus further includes a determining unit configured to determine a first PE as a destination receiver of the response packet, where the obtaining unit is configured to obtain the detection result from the response packet when the first PE is determined as the receiver of the response packet.

In a possible design, in a second implementation of the seventh aspect of embodiments of this application, the determining unit is configured to determine the first PE as the receiver of the response packet based on the bypass VXLAN tunnel source IP address in the response packet; or the determining unit is configured to determine the first PE as the receiver of the response packet based on a second destination IP address in the response packet, where the second destination IP address is an IP address of a first CE.

An eighth aspect of embodiments of this application provides a connectivity negotiation relationship establishment apparatus, including a first setting unit configured to set a state of a first enabling switch to a first state, where a bypass VXLAN tunnel is established between a first provider edge PE and a third PE; a second setting unit configured to set a value of a C bit of an active-active extended community attribute based on the first state; and a sending unit configured to send a route and the C bit to the third PE.

A ninth aspect of embodiments of this application provides a packet detection apparatus, including a receiving unit configured to receive a detection packet sent by a first PE, where the detection packet includes a bypass VXLAN tunnel source IP address; a generation unit configured to generate a response packet based on the detection packet, where the response packet includes the bypass VXLAN tunnel source IP address; and a sending unit configured to send the response packet.

A ninth aspect of embodiments of this application provides a packet detection apparatus, including a receiving unit configured to receive a response packet sent by a second provider edge PE; and a sending unit configured to send the response packet to N other PEs through N bypass VXLAN tunnels when it is determined that a destination receiver of the response packet is a device different from a third PE, where N is an integer greater than or equal to 1.

A tenth aspect of embodiments of this application provides a packet detection apparatus, including a receiving unit configured to receive a response packet sent by a second PE, where the response packet includes a bypass VXLAN tunnel source IP address; a determining unit configured to determine a bypass VXLAN tunnel based on a bypass VXLAN tunnel IP address; and a sending unit configured to send the response packet to a first PE through the bypass VXLAN tunnel.

An eleventh aspect of embodiments of this application provides a connectivity negotiation relationship establishment apparatus, including a setting unit configured to set a state of a second enabling switch to a first state, where a bypass VXLAN tunnel is established between a third PE and a first PE; a receiving unit configured to receive a route and a C bit of an active-active extended community attribute that are sent by the first PE; and a determining unit configured to, if the state of the second enabling switch is the first state, the route matches a target route of the third PE, and a value of the C bit is set, determine that a connectivity negotiation relationship is successfully established.

A twelfth aspect of embodiments of this application provides a packet detection device, including a memory, a transceiver, a processor, and a bus system, where the memory is configured to store a program; the processor is configured to execute the program in the memory, including performing the method according to any implementation of the first aspect; performing the method according to any implementation of the third aspect; performing the method any implementation of the fourth aspect; or performing the method any implementation of the fifth aspect; and the bus system is configured to connect the memory and the processor, to enable the memory and the processor to communicate with each other.

A thirteenth aspect of embodiments of this application provides a connectivity negotiation relationship establishment device, including a memory, a transceiver, a processor, and a bus system, where the memory is configured to store a program; the processor is configured to execute the program in the memory, including performing the method according to any implementation of the second aspect; or performing the method according to any implementation of the sixth aspect; and the bus system is configured to connect the memory and the processor, to enable the memory and the processor to communicate with each other.

A fourteenth aspect of embodiments of this application provides a computer storage medium. The computer storage medium stores instructions, and when the instructions are executed on a computer, the computer is enabled to perform the method according to any implementation of the first aspect; or the computer is enabled to perform the method according to any implementation of the second aspect; or the computer is enabled to perform the method according to any implementation of the third aspect; or the computer is enabled to perform the method according to any implementation of the fourth aspect; or the computer is enabled to perform the method according to any implementation of the fifth aspect; or the computer is enabled to perform the method according to any implementation of the sixth aspect.

A fifteenth aspect of embodiments of this application provides a computer program product. When the computer program product is executed on a computer, the computer is enabled to perform the method according to any implementation of the first aspect; or the computer is enabled to perform the method according to any implementation of the second aspect; or the computer is enabled to perform the method according to any implementation of the third aspect; or the computer is enabled to perform the method according to any implementation of the fourth aspect; or the computer is enabled to perform the method according to any implementation of the fifth aspect; or the computer is enabled to perform the method according to any implementation of the sixth aspect.

DESCRIPTION OF EMBODIMENTS

Figure 1:
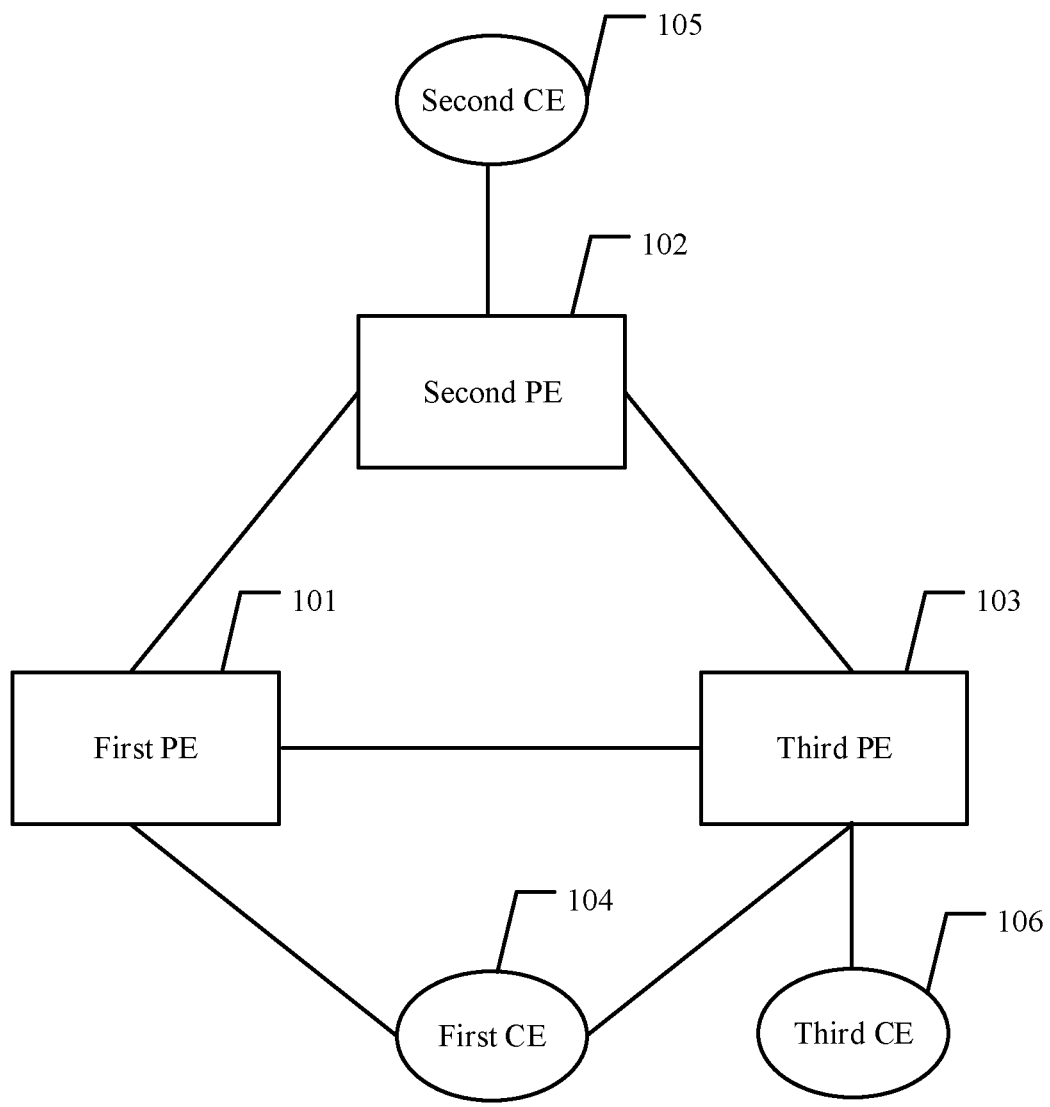
FIG. 1 is a schematic diagram of a network framework according to an embodiment of this application.

Embodiments of this application provide a packet detection method, a connectivity negotiation relationship establishment method, and a related device, and may be applied to an EVPN-VXLAN dual-homing active-active scenario in an anycast case, so that a first PE can determine a detection result based on a response packet.

To better understand the packet detection method in embodiments of this application, the following describes the scenario to which embodiments of this application are applied.

For a CE and a PE, the CE is located at a customer site. In a network, the CE is a VPN device that directly faces a user and that is connected to the PE. The PE is located on a provider network edge, and is a VPN device whose one end faces a provider network and other end is connected to one or more CEs through network access.

A VXLAN is a network virtualization technology. A data packet sent by a virtual machine is encapsulated in a User Datagram Protocol (UDP) by using an IP address or a MAC address of a physical network, and then is transmitted in a network. After arriving at a destination, the data packet is decapsulated by a VXLAN tunnel endpoint, and data is sent to a target virtual machine.

An EVPN is a VPN technology applied to layer 2 network interconnection. In an EVPN technology, a mechanism similar to a BGP is used. New network layer reachability information (NLRI), namely, EVPN NLRI is defined based on the BGP. The EVPN NLRI defines several new BGP EVPN route types, for example, a type 2 route that is also referred to as media access control (MAC) route or an IP route; for example, a type 3 route that is also referred to as an inclusive multicast route; and for example, a type 5 route that is also referred to as an IP prefix route. These routes are used for MAC address learning and publishment between different PEs in a layer 2 network.

Anycast is a network addressing and routing policy, to determine, based on a routing topology, that data can be sent to a "closest" or "best" destination. For example, in embodiments of this application, a response packet is sent to a PE associated with an IP address of a first CE, for example, a first PE and a third PE. In anycast, there is a one-to-many relationship between an anycast address and a network node. Each address corresponds to a group of receiving nodes, but at any given time, only one of the group of receiving nodes can receive information from a transmit end. In other words, only one PE in the first PE and the third PE can receive the response packet. In the Internet, BGP anycast is usually used.

For dual-homing active-active and a bypass VXLAN tunnel, a first CE is dual-homed to a first PE and a third PE, and for a network side, the first PE and the third PE use a virtual address as an address of a network visible entity (NVE) interface, namely, an anycast network endpoint (VXLAN tunnel endpoint (VTEP)) address. Therefore, only a VTEP IP address of one remote end is sensed on the network side. On the network side, it is configured to establish a dynamic VXLAN tunnel between a VTEP address and an anycast VTEP address, to implement communication among the first PE, the second PE, and the network side. A network-side downlink packet may arrive at the dual-homed first CE by randomly selecting the first PE or the third PE. However, a single-homed CE, for example, a third CE and a fourth CE, may also exist in a network. Therefore, after arriving at one PE, the network-side downlink packet may further need to arrive at another PE device through bypassing before arriving at the single-homed CE device. Therefore, a VXLAN tunnel needs to be established between a PE 1 and a PE 2 that are active-active and is used as a bypass channel. The bypass VXLAN tunnel may be a bypass layer 2 VXLAN tunnel, or may be a bypass layer 3 VXLAN tunnel.

The foregoing describes the scenario to which embodiments of this application are applied. The following describes a network framework in embodiments of this application. Referring to FIG. 1, the network framework in embodiments of this application includes a first PE 101, a second PE 102, and a third PE 103; and a first CE 104, a second CE 105, and a third CE 106.

The first CE 104 is dual-homed to the first PE 101 and the third PE 103. The second CE is single-homed to the second PE 102. The third CE is single-homed to the third PE 103. The first PE 101 and the second PE 102 are connected through a VXLAN tunnel. The second PE 102 and the third PE 103 are connected through a VXLAN tunnel. The first PE 101 and the third PE 103 are connected through a bypass VXLAN tunnel.

It can be understood that, in the figure, the first CE and the third CE are separately single-homed to the third PE 103. In an actual application, more CEs may be connected to the third PE 103, or the third CE 106 may not exist. This is not limited herein. Similarly, another PE may also be connected to another CE, for example, a fourth CE or a fifth CE.

It can be understood that, that the first PE 101 and the second PE 102 are connected through the VXLAN tunnel does not mean that the first PE 101 and the second PE 102 are directly connected, and another node, for example, the fourth PE and the fifth PE, may exist between the first PE 101 and the second PE 102. This is not limited herein. Similarly, the same is true to the first PE 101 and the third PE 100, and to the second PE 102 and the third PE 103.

In embodiments of this application, a main function of the first PE 101 is to execute a detection command, create a detection packet based on the detection command, send the detection packet to the second PE 102, and after receiving a response packet, determine a detection result based on the response packet.

In embodiments of this application, a main function of the second PE 102 is to generate the response packet based on the detection packet, and then send the response packet to the first PE 101 or the third PE 103.

In embodiments of this application, a main function of the third PE 103 is to forward the response packet.

The foregoing describes the network framework in embodiments of this application, and the following describes the packet detection method in embodiments of this application.

In an anycast case, because a bypass VXLAN tunnel is established between the first PE and the third PE, and the first CE separately establishes a communication connection to the first PE and the third PE, after the second PE receives the detection packet and generates the response packet based on the detection packet, the second PE may send the response packet to the third PE, or may send the response packet to the first PE. However, in an actual application, only one case occurs. To be specific, only one PE in the third PE and the first PE can receive the response packet. Therefore, the following separately describes the two cases.

1. A Case in which the Second PE Sends the Response Packet to the Third PE

Figure 2:
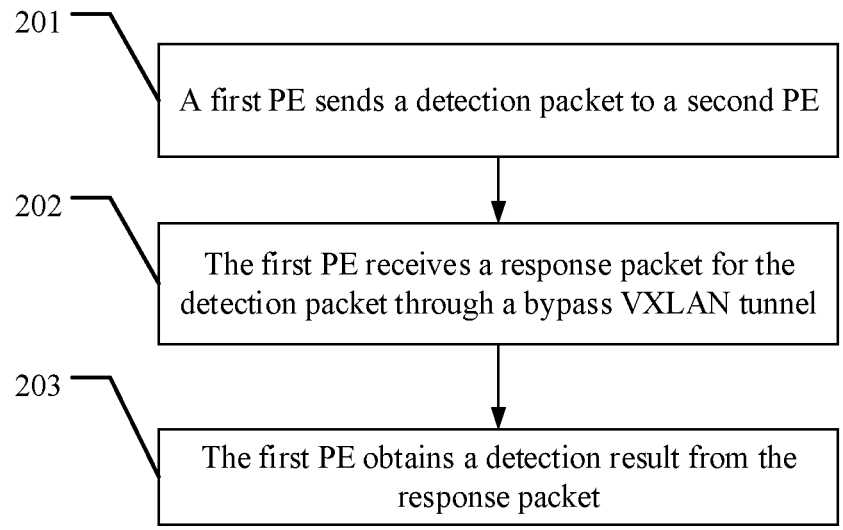
FIG. 2 is a schematic flowchart of a packet detection method according to an embodiment of this application.

Referring to FIG. 2, an embodiment of the packet detection method in embodiments of this application includes the following steps.

201: A first PE sends a detection packet to a second PE.

The first PE executes a detection command that carries a first source IP address that is an IP address of a first CE, a first destination IP address that is an IP address of a second CE, and a VPN instance. The first PE creates the detection packet based on the detection command, and sends the detection packet to the second PE. The detection packet is used to enable the second PE to generate a response packet.

202: The first PE receives a response packet for the detection packet through a bypass VXLAN tunnel.

A bypass VXLAN tunnel is established between the first PE and a third PE. Therefore, if the second PE generates the response packet based on the detection packet sent by the first PE, and the second PE sends the response packet to the third PE, the first PE may receive, through the bypass VXLAN tunnel, the response packet sent by the third PE.

The response packet is generated by the second PE based on the detection packet sent by the first PE, a second source IP address in the response packet is the IP address of the second CE, and a second destination IP address is the IP address of the first CE. That the second PE sends the response packet to the third PE means that the second PE commands unicast routing to send the response packet to the third PE. In other words, an outbound interface of a route points to the third PE.

203: The first PE obtains a detection result from the response packet.

After receiving the response packet sent by the third PE and removing a VXLAN header of the response packet, the first PE may obtain content of the response packet, and the first PE obtains the detection result based on the content of the response packet.

That the first PE obtains the detection result based on the content of the response packet means that the first PE obtains, based on the content of the response packet, a result that detection succeeds. However, some problems cannot be resolved according to the packet detection method in this embodiment of this application, and interfere with the detection result, causing a detection failure, for example, a data loss, or a data error. After an interference factor is excluded, that the first PE obtains the detection result based on the response packet means that the first PE obtains, based on the response packet, the result that detection succeeds.

In this embodiment of this application, the first PE sends the detection packet to the second PE. The detection packet is used to enable the second PE to generate the response packet, and the response packet includes a bypass VXLAN tunnel source IP address. Therefore, when the third PE receives the response packet and sends the response packet to the first PE based on the bypass VXLAN tunnel source IP address, the first PE may receive, through the bypass VXLAN tunnel, the response packet that is sent by the third PE. Therefore, the first PE may obtain the detection result based on the response packet.

2. A Case in which the Second PE Sends the Response Packet to the First PE

Figure 3:
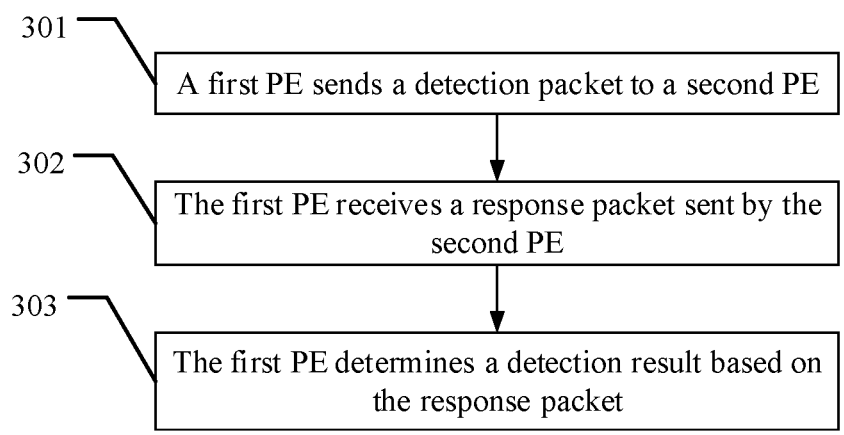
FIG. 3 is another schematic flowchart of a packet detection method according to an embodiment of this application.

Referring to FIG. 3, an embodiment of the packet detection method in embodiments of this application includes the following steps.

301: A first PE sends a detection packet to a second PE.

The first PE executes a detection command that carries a first source IP address that is an IP address of a first CE, a first destination IP address that is an IP address of a second CE, and a VPN instance. The first PE creates the detection packet based on the detection command, and sends the detection packet to the second PE. The detection packet is used to enable the second PE to generate a response packet. The detection packet carries a bypass VXLAN tunnel source IP address.

302: The first PE receives the response packet sent by the second PE.

A VXLAN tunnel is established between the first PE and the second PE. Therefore, the first PE may receive the response packet sent by the second PE through encapsulation.

The response packet is generated by the second PE based on the detection packet sent by the first PE, a destination IP address and a source IP address in the response packet change, a second source IP address is the IP address of the second CE, and a second destination IP address is the IP address of the first CE. The response packet carries a bypass VXLAN tunnel source IP address, and the bypass VXLAN tunnel source IP address is copied by the second PE from the detection packet. That the second PE sends the response packet to the first PE means that the second PE commands unicast routing to send the response packet to the first PE. In other words, an outbound interface of a route points to the first PE.

303: The first PE determines a detection result based on the response packet.

After receiving the response packet sent by the first PE and removing a VXLAN header of the response packet, the first PE may obtain content of the response packet, and the first PE determines the detection result based on the content of the response packet.

The response packet carries the bypass VXLAN tunnel source IP address, and the first PE determines whether the response packet carries the bypass VXLAN tunnel source IP address, and whether the first PE is an initiator of the detection packet. The first PE can obtain the detection result only when the response packet carries the bypass VXLAN tunnel source IP address and the first PE is the initiator of the detection packet.

In this embodiment of this application, the first PE sends the detection packet to the second PE. The detection packet carries the bypass VXLAN tunnel source IP address, the detection packet is used to enable the second PE to generate the response packet, and the response packet also carries the bypass VXLAN tunnel source IP address. When the second PE sends the response packet to the first PE, the first PE can receive, through the VXLAN tunnel, the response packet sent by the first PE. Therefore, the first PE may determine the detection result based on a case in which the response packet carries the bypass VXLAN tunnel source IP address and the first PE is the initiator of the detection packet.

Figure 4:
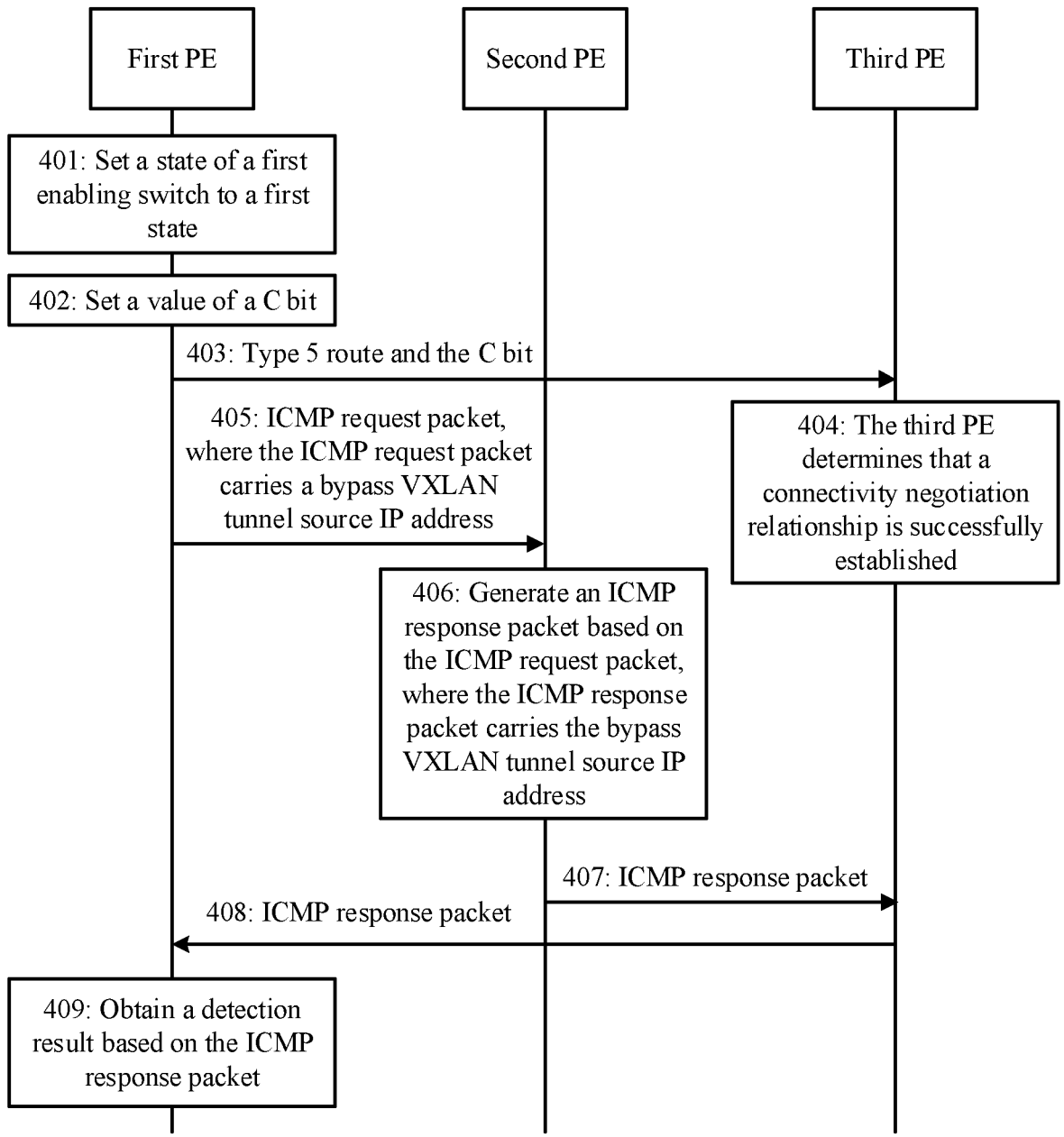
FIG. 4 is another schematic flowchart of a packet detection method according to an embodiment of this application.

Referring to FIG. 4, another embodiment of the packet detection method in embodiments of this application includes the following steps.

401: A first PE sets a state of a first enabling switch to a first state.

The first PE may preset a switch to the first enabling switch. When the first PE needs to establish a connectivity negotiation relationship, the first PE may set the state of the first enabling switch to the first state.

402: The first PE sets a value of a C bit.

After setting the state of the first enabling switch to the first state, the first PE may set the value of the C bit based on the first state. The first PE may set the value of the C bit only when the state of the first enabling switch is the first state. The first state of the first enabling switch is usually an on state. The value of the C bit is set, so that the C bit becomes valid in the third PE, and the first PE and the third PE can successfully establish the connectivity negotiation relationship.

Figure 5:
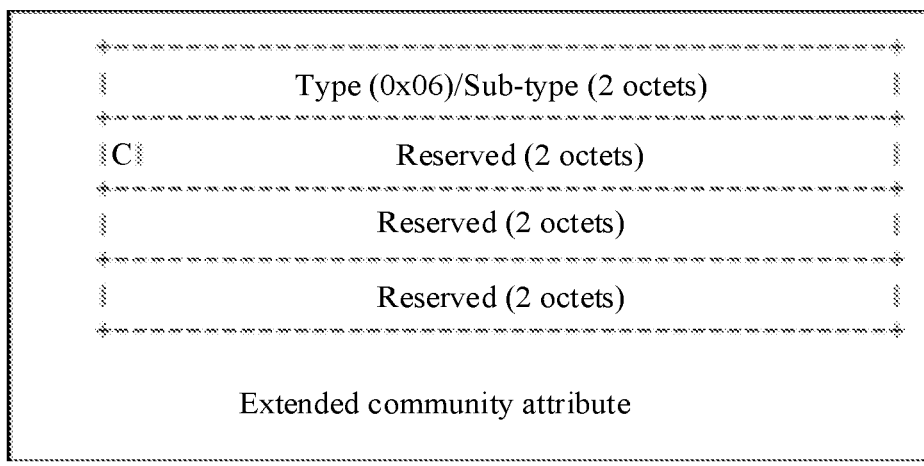
FIG. 5 is a schematic diagram of a format of a C bit according to an embodiment of this application.

A format of the C bit may be shown in FIG. 5.

403: The first PE sends a type 5 route and the C bit to the third PE.

Because a bypass VXLAN tunnel is established between the first PE and the third PE, the first PE may obtain an IP address of the third PE. When the bypass VXLAN tunnel between the first PE and the third PE is a bypass layer 3 VXLAN tunnel, to establish a connectivity negotiation relationship between the first PE and the third PE, the first PE may send the type 5 route and the C bit to the third PE based on the IP address. A value of the IP address that is of the first PE and that is carried in the type 5 route is 0.

To facilitate description that the value of the IP address that is of the first PE and that is carried in the type 5 route is 0, the following describes the type 5 route with reference to Table 1. A packet format of the type 5 route is shown in Table 1. It can be understood that Table 1 is merely an example of the packet format of the type 5 route. A field IP Prefix in Table 1 is an IP prefix address carried in the route, and that the value of the IP address that is of the first PE and that is carried in the type 5 route is 0 means that in an entry IP Prefix, a value of this entry is 0.0.0.0. When the value of the IP address that is of the first PE and that is carried in the type 5 route is not 0, a value of this entry may be 192.168.10.1.

TABLE 1

| | |
|---|---|
| Route Distinguisher (eight bytes) | RD value |
| Ethernet Segment Identifier (10 bytes) | Unique identifier defined for a connection to a peer end |
| Ethernet Tag ID (four bytes) | Actually configured VLAN ID |
| IP Prefix Length (one byte) | IP prefix mask length |
| IP Prefix (four or 16 bytes) | IP prefix address |
| GW IP Address (four or 16 bytes) | Default gateway address |
| MPLS Label (three bytes) | Layer 3 VNI |

It can be understood that, when the bypass VXLAN tunnel between the first PE and the third PE is a bypass layer 3 VXLAN tunnel, the first PE may not only send the type 5 route to the third PE, but also may send another route, for example, a type 2 route to the third PE in an actual application. This is not limited herein.

404: The third PE determines that the connectivity negotiation relationship is successfully established.

The third PE not only needs to determine whether a state of a second enabling switch is the first state, but also needs to determine, based on the received type 5 route and the C bit, whether the C bit is valid, in other words, whether the value of the C bit is set, and determine whether the type 5 route matches a target route (RT) of the third PE. Only when the state of the second enabling switch is the first state, the value of the C bit is set, and the type 5 route matches the RT of the third PE, the third PE can determine that the connectivity negotiation relationship between the first PE and the third PE is successfully established.

The second enabling switch is a switch set on the third PE. When the third PE agrees to establish the connectivity negotiation relationship, the third PE may set the state of the second enabling switch to the first state.

The RT includes an import RT and an export RT, and the import RT and the export RT are respectively used to import route information and export a policy. When a VPN route is imported into a VPN routing forwarding (VRF) table, only a route whose RT tag matches any import RT in the VRF table can be imported into the VRF table. In this embodiment, the third PE has a VRF table, and the import RT is recorded in the VRF table. Only when an RT tag carried in the type 5 route sent by the first PE matches the import RT in the VRF table, the type 5 route is imported into the VRF table of the third PE. Only when the third PE receives the response packet, the third PE can send the response packet to the first PE based on the route.

405: The first PE sends an ICMP request packet to the second PE.

The first PE executes a ping command that carries a first source IP address that is an IP address of a first CE, a first destination IP address that is an IP address of a second CE, and a VPN instance. The first PE creates an Internet Control Message Protocol (ICMP) request packet based on the ping command, and sends the ICMP request packet to the second PE. The ICMP request packet carries the first source IP address, the first destination IP address, and the bypass VXLAN tunnel source IP address, the first source IP address is the IP address of the first CE, and the second destination IP address is the IP address of the second CE.

406: The second PE generates an ICMP response packet based on the ICMP request packet.

After receiving the ICMP request packet, the second PE decapsulates a VXLAN header, identifies the first destination IP address in the ICMP request packet, and generates the ICMP response packet if the first destination IP address is the same as the IP address of the second CE. The second source IP address in the ICMP response packet is the IP address of the second CE, the second destination IP address is the IP address of the first CE, and the bypass VXLAN tunnel source IP address carried in the ICMP request packet is copied into the ICMP response packet.

Figure 6:
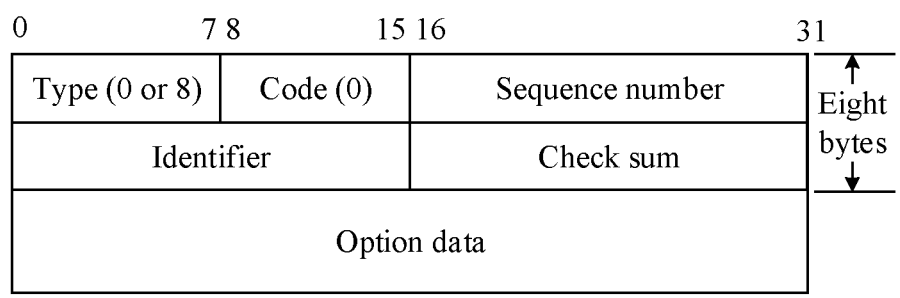
FIG. 6 is a schematic diagram of a format of an ICMP request packet according to an embodiment of this application.

FIG. 6 is a schematic diagram of a format of an ICMP request packet and a format of an ICMP response packet. It can be understood that FIG. 6 is merely an example of the ICMP request packet and the ICMP response packet. Before the first PE sends the ICMP request packet to the second PE, the first PE may use option data of the ICMP request packet to carry the bypass VXLAN tunnel source IP address. When the second PE generates the ICMP response packet based on the ICMP request packet sent by the first PE, the second PE may also use option data of the ICMP response packet to carry the bypass VXLAN tunnel source IP address.

It can be understood that, the first PE may use the option data of the ICMP request packet to carry the bypass VXLAN tunnel source IP address. In an actual application, there is another carrying manner. For example, a table is separately configured, and the table carries the bypass VXLAN tunnel source IP address. This is not limited herein.

407: The second PE sends the ICMP response packet to the third PE.

After the second PE encapsulates the ICMP response packet with a VXLAN header, the second PE commands unicast routing to send the ICMP response packet to the third PE. In other words, an outbound interface of a route points to the third PE.

408: The third PE sends the ICMP response packet to the first PE through the bypass VXLAN tunnel.

After the third PE receives the ICMP response packet, the third PE determines that the second destination IP address in the ICMP response packet is the IP address of the first CE, and that the third PE is not an initiator of the ICMP request packet. The third PE needs to discard the ICMP response packet, but the bypass VXLAN tunnel source IP address in the ICMP response packet is an address at which the third PE may arrive through the bypass VXLAN tunnel, and the connectivity negotiation relationship between the first PE and the third PE is successfully established. Therefore, the third PE sends the ICMP response packet to the first PE through the bypass VXLAN tunnel.

After receiving the ICMP response packet, the third PE may obtain, only by removing the VXLAN header of the ICMP response packet, the second destination IP address and the bypass VXLAN tunnel source IP address that are carried in the ICMP response packet. Because the first CE is dual-homed to the first PE and the third PE, the third PE may also obtain the IP address of the first CE. The third PE compares the second destination IP address carried in the ICMP response packet and the IP address of the first CE, to determine whether the second destination IP address carried in the ICMP response packet is the same as the IP address of the first CE. The ICMP response packet is obtained by the second PE based on the ICMP request packet, and the ICMP request packet is sent by the first PE to the second PE. Therefore, the third PE is not the initiator of the ICMP request packet. A bypass VXLAN tunnel is established between the first PE and the third PE. Therefore, the third PE may obtain an IP address of an endpoint of the bypass VXLAN tunnel. The first PE and the third PE are two endpoints of the bypass VXLAN tunnel. Therefore, the third PE may obtain the IP address of the first PE. If the third PE determines the bypass VXLAN tunnel source IP address as the IP address of the first PE after obtaining the bypass VXLAN tunnel source IP address, the third PE determines that the bypass VXLAN tunnel source IP address is an address that may be reached through the bypass VXLAN tunnel.

409: The first PE obtains a detection result based on the ICMP response packet.

After the first PE receives the ICMP response packet forwarded by the third PE, if the first PE determines that the ICMP response packet carries the bypass VXLAN tunnel source IP address, and the first PE is the initiator of the ICMP request packet, the first PE sends the ICMP response packet to a central processing unit (CPU) for processing, and finally, detection succeeds.

After receiving the ICMP response packet and removing the VXLAN header of the ICMP response packet, the first PE may obtain the bypass VXLAN tunnel source IP address carried in the ICMP response packet. The bypass VXLAN tunnel source IP address is an IP address of a first PE end in two ends of the bypass VXLAN tunnel between the first PE and the third PE.

409: The first PE obtains a detection result based on the ICMP response packet.

The first PE may receive the ICMP response packet forwarded by the third PE. After the first PE receives the ICMP response packet, if the first PE determines, through comparison, that the second destination IP address in the ICMP response packet is the same as the IP address of the first CE, and the first PE is the initiator of the ICMP request packet, the first PE sends the ICMP response packet to the CPU for processing, and finally obtains the detection result.

It can be understood that the first PE may determine the detection result based on a case in which the bypass VXLAN tunnel source IP address is the same as the bypass VXLAN tunnel source IP address carried in the ICMP response packet and the first PE is the initiator of the ICMP request packet, or may determine the detection result based on a case in which the second destination IP address in the ICMP response packet is the same as the IP address of the first CE and the first PE is the initiator of the ICMP request packet. In an actual application, an implementation may be selected to obtain the detection result. In other others, one of step 409 and step 410 is selected and performed.

It can be understood that the first PE may obtain the detection result based on a case in which the ICMP response packet carries the bypass VXLAN tunnel source IP address and the first PE is the initiator of the ICMP request packet. In an actual application, there is another manner of determining the detection result. For example, the first PE obtains the detection result based on a case in which the second destination IP address in the ICMP response packet is the same as the IP address of the first CE and the first PE is the initiator of the ICMP request packet. This is not limited herein.

It can be understood that, the detection packet may be an ICMP request packet, and the response packet may be an ICMP response packet. In an actual application, the detection packet and the response packet each may be another packet. For example, the detection packet may be a 2544 request packet, and the response packet may be a 2544 response packet. This is not limited herein.

It can be understood that there is no limited time sequence relationship among step 401, step 404, step 405, step 406, and step 407. Step 401 and step 404 may be performed between step 406 and step 407, and step 401 and step 404 may alternatively be performed after step 407. It only needs to be ensured that step 401 and step 404 are performed before step 408. This is not limited herein.

Figure 7:
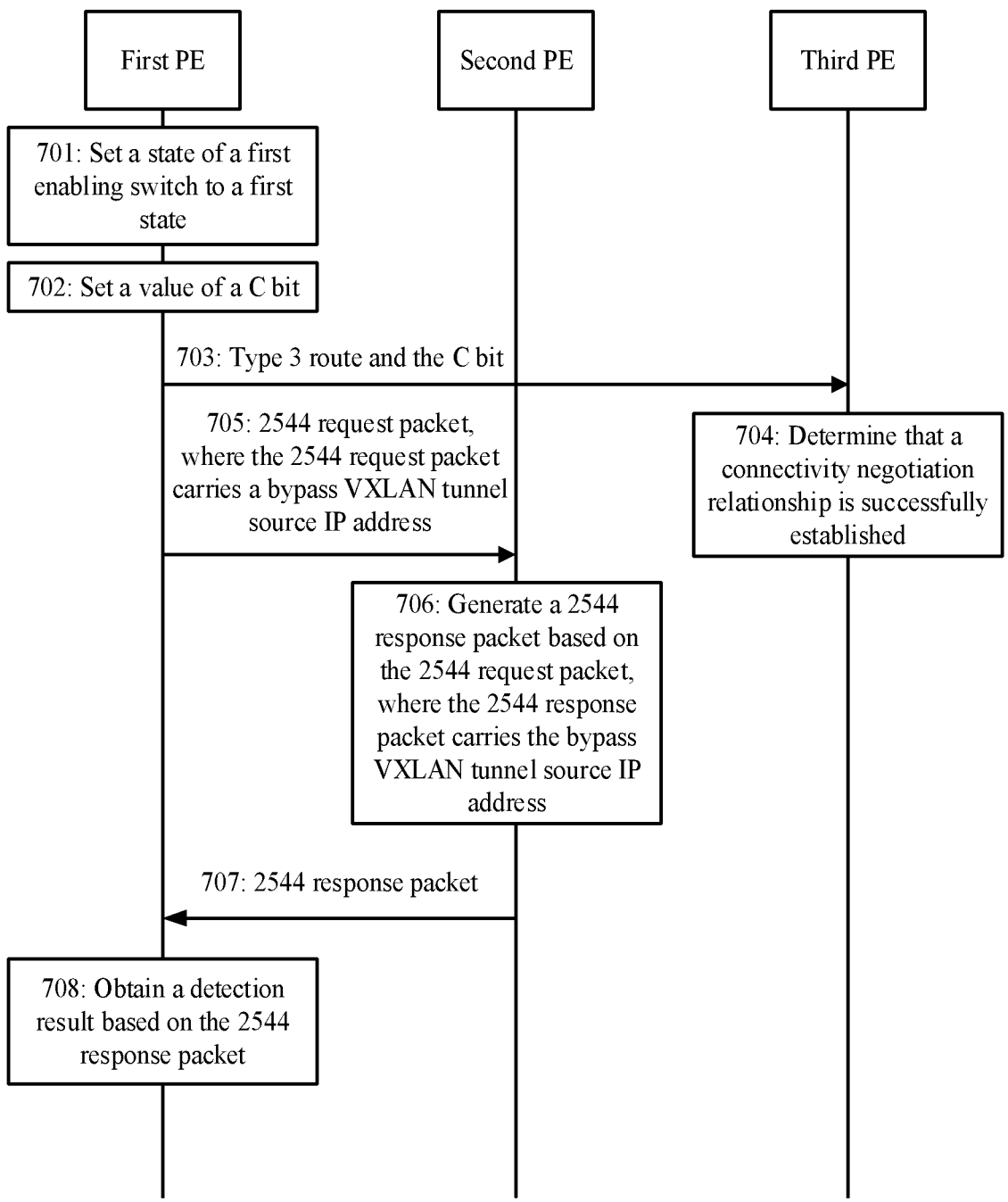
FIG. 7 is another schematic flowchart of a packet detection method according to an embodiment of this application.

Referring to FIG. 7, another embodiment of the packet detection method in embodiments of this application includes the following steps.

701: A first PE sets a state of a first enabling switch to a first state.

702: The first PE sets a value of a C bit.

Step 701 and step 702 are similar to step 401 and step 402 in FIG. 4. Details are not described herein again.

703: The first PE sends a type 3 route and the C bit to a third PE.

Because a bypass VXLAN tunnel is established between the first PE and the third PE, the first PE may obtain an IP address of the third PE. When the bypass VXLAN tunnel between the first PE and the third PE is a bypass layer 2 VXLAN tunnel, to establish a connectivity negotiation relationship between the first PE and the third PE, the first PE may send the type 3 route and the C bit to the third PE based on the IP address.

704: The third PE determines that the connectivity negotiation relationship is successfully established.

The third PE not only needs to determine whether a state of a second enabling switch is the first state, but also needs to determine, based on the received type 3 route and the C bit, whether the C bit is valid, in other words, whether the value of the C bit is set, and determine whether the type 3 route matches an RT of the third PE. Only when the state of the second enabling switch is the first state, the value of the C bit is set, and the type 3 route matches the RT of the third PE, the third PE can determine that the connectivity negotiation relationship between the first PE and the third PE is successfully established.

In this embodiment, the third PE has a VRF table, and an import RT is recorded in the VRF table. Only when an RT tag carried in the type 3 route sent by the first PE matches the import RT in the VRF table, the type 3 route is imported into the VRF table of the third PE. Only when the third PE receives a response packet, the third PE can send the response packet to the first PE based on the route.

705: The first PE sends a 2544 request packet to the second PE, where the 2544 request packet carries a bypass VXLAN tunnel source IP address.

The first PE executes a detection command that carries a first source IP address that is an IP address of a first CE, a first destination IP address that is an IP address of a second CE, and a VPN instance. The first PE creates the 2544 request packet based on the detection command, and sends the 2544 request packet to the second PE. The 2544 request packet carries the bypass VXLAN tunnel source IP address.

706: The second PE generates a 2544 response packet based on the 2544 request packet, where the 2544 response packet carries the bypass VXLAN tunnel source IP address.

After receiving the 2544 request packet, the second PE decapsulates a VXLAN header, identifies the first destination IP address in the 2544 request packet, and generates the 2544 response packet if the first destination IP address is the same as the IP address of the second CE. The second source IP address in the 2544 response packet is the IP address of the second CE, the second destination IP address is the IP address of the first CE, and the bypass VXLAN tunnel source IP address carried in the 2544 request packet is copied into the 2544 response packet.

Figure 8:
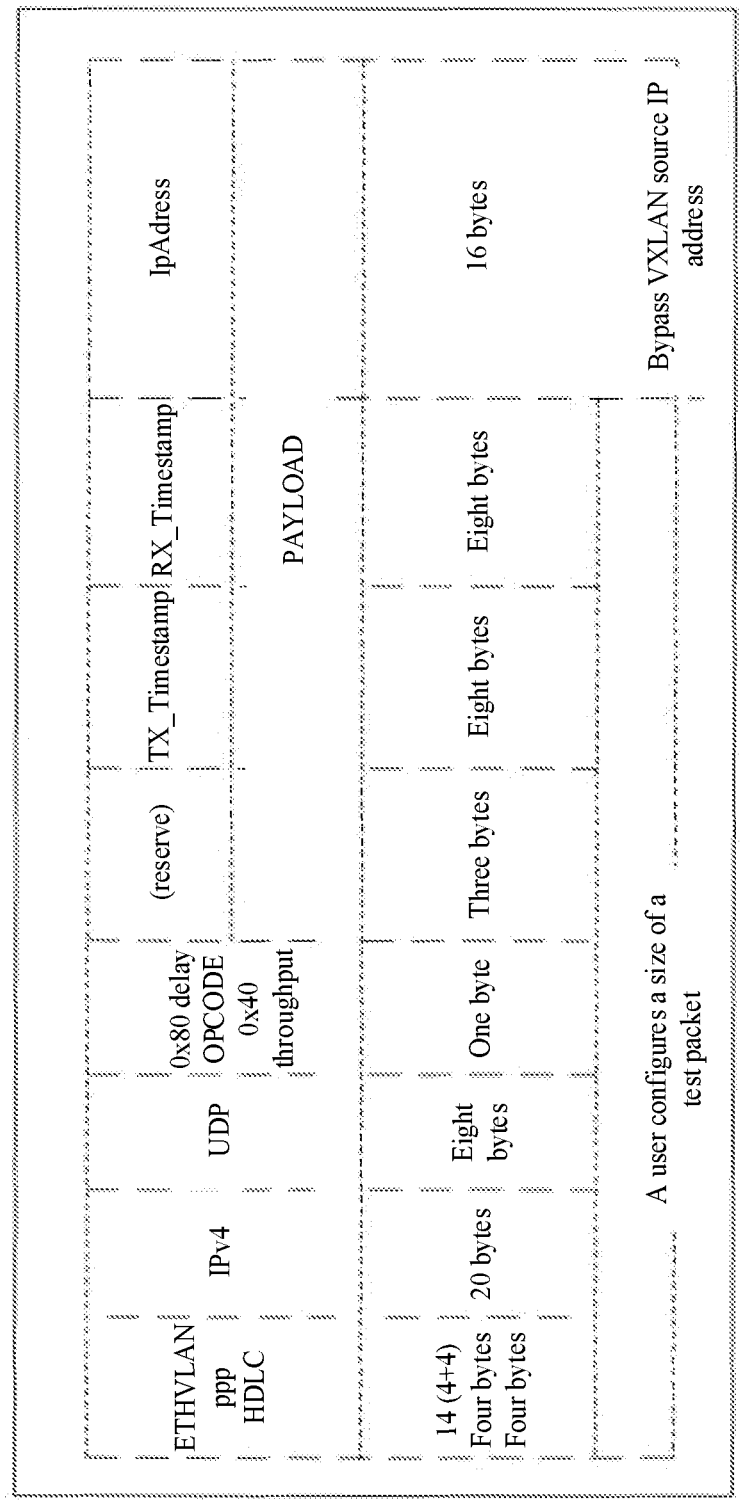
FIG. 8 is a schematic diagram of a format of a 2544 request packet according to an embodiment of this application.

FIG. 8 is a schematic diagram of a format of a 2544 request packet and a format of a 2544 response packet. It can be understood that FIG. 8 is merely an example of the 2544 request packet and the 2544 response packet. Before the first PE sends the 2544 request packet to the second PE, the first PE may use an IP address field of the 2544 request packet to carry the bypass VXLAN tunnel source IP address. When the second PE generates the 2544 response packet based on the 2544 request packet sent by the first PE, the second PE may further use an IP address field of the 2544 response packet to carry the bypass VXLAN tunnel source IP address.

It can be understood that, the first PE may use the IP address field of the 2544 request packet to carry the bypass VXLAN tunnel source IP address. In an actual application, there is another carrying manner. For example, a table is separately configured, and the table carries the bypass VXLAN tunnel source IP address. This is not limited herein.

707: The second PE sends the 2544 response packet to the first PE.

After the second PE encapsulates the 2544 response packet with a VXLAN header, the second PE commands unicast routing to send the 2544 response packet to the first PE. In other words, an outbound interface of a route points to the first PE.

708: The first PE obtains a detection result based on the 2544 response packet.

After the first PE receives the 2544 response packet forwarded by the third PE, if the first PE determines, through comparison, that the bypass VXLAN tunnel source IP address is the same as a first IP address carried in the 2544 response packet, and the first PE is an initiator of the 2544 request packet, the first PE sends the 2544 response packet to a CPU for processing, and finally obtains the detection result.

After the first PE receives the 2544 response packet and removes the VXLAN header from the 2544 response packet, the first PE may obtain the bypass VXLAN tunnel source IP address carried in the 2544 response packet, and the first PE may also obtain an IP address of a first PE end in two ends of the bypass VXLAN tunnel, and then the first PE compares the address of the first PE end and the bypass VXLAN tunnel source IP address, to determine whether the address of the first PE end is the same as the bypass VXLAN tunnel source IP address.

709: The first PE obtains the detection result based on the 2544 response packet.

After the first PE receives the 2544 response packet, if the first PE determines, through comparison, that the second destination IP address and the IP address of the first CE that are carried in the 2544 response packet, and the first PE is the initiator of the 2544 request packet, the first PE sends the 2544 response packet to the CPU for processing, and finally obtains the detection result.

It can be understood that, the first PE may obtain the detection result based on a case in which the 2544 response packet carries the bypass VXLAN tunnel source IP address and the first PE is the initiator of the 2544 request packet, or may obtain the detection result based on a case in which the second destination IP address in the 2544 response packet is same as the IP address of the first CE and the first PE is the initiator of the 2544 request packet. In an actual application, an implementation may be selected to obtain the detection result. One of step 708 and step 709 is selected and performed.

It can be understood that the first PE may obtain the detection result based on a case in which the 2544 response packet carries the bypass VXLAN tunnel source IP address and the first PE is the initiator of the 2544 request packet. In an actual application, there is another manner of obtaining the detection result. For example, the first PE obtains the detection result based on a case in which the second destination IP address in the 2544 response packet is same as the IP address of the first CE and the first PE is the initiator of the 2544 request packet. This is not limited herein.

It can be understood that, the detection packet may be a 2544 request packet, and the response packet may be a 2544 response packet. In an actual application, the detection packet and the response packet each may be another packet. For example, the detection packet may be an ICMP request packet, and the response packet may be an ICMP response packet. This is not limited herein.

It can be understood that there is no limited time sequence relationship among step 701, step 704, step 705, and step 706, step 701 and step 704 may be performed between step 705 and step 706, and step 701 and step 704 may alternatively be performed after step 706. It only needs to be ensured that step 701 and step 704 are performed before step 707. This is not limited herein.

Figure 9:
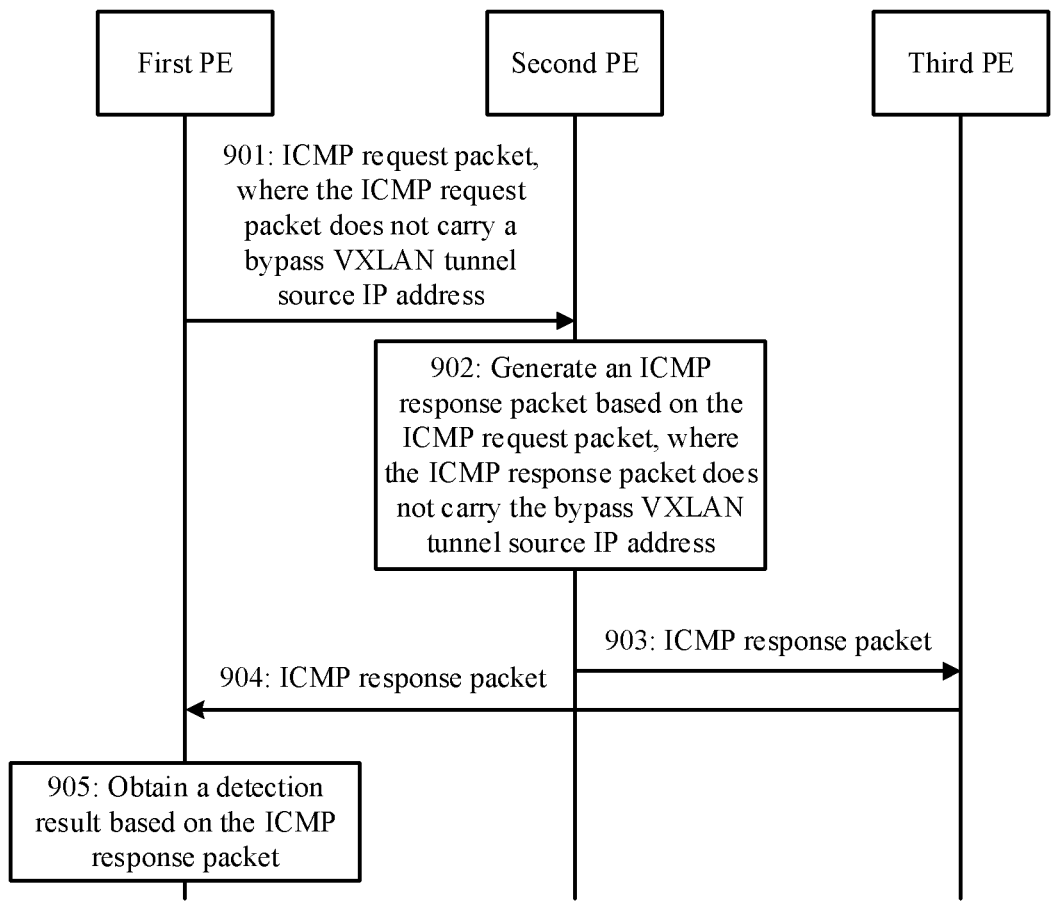
FIG. 9 is another schematic flowchart of a packet detection method according to an embodiment of this application.

Referring to FIG. 9, another embodiment of the packet detection method in embodiments of this application includes the following steps.

901: A first PE sends an ICMP request packet to a second PE, where the ICMP request packet does not carry a bypass VXLAN tunnel source IP address.

The first PE executes a ping command that carries a first source IP address that is an IP address of a first CE, a first destination IP address that is an IP address of a second CE, and a VPN instance. The first PE creates an ICMP request packet based on the ping command, and sends the ICMP request packet to the second PE. The ICMP request packet carries the first source IP address and the first destination IP address, the first source IP address is the IP address of the first CE, the second destination IP address is the IP address of the second CE, and the ICMP request packet does not carry the bypass VXLAN tunnel source IP address.

It can be understood that the ICMP request packet may alternatively carry the bypass VXLAN tunnel source IP address.

902: The second PE generates an ICMP response packet based on the ICMP request packet, where the ICMP response packet does not carry the bypass VXLAN tunnel source IP address.

After receiving the ICMP request packet, the second PE decapsulates a VXLAN header, identifies the first destination IP address in the ICMP request packet, and generates the ICMP response packet if the first destination IP address is the same as the IP address of the second CE. The second source IP address in the ICMP response packet is the IP address of the second CE, the second destination IP address is the IP address of the first CE, and the ICMP response packet does not carry the bypass VXLAN tunnel source IP address.

It can be understood that the ICMP response packet may alternatively carry the bypass VXLAN tunnel source IP address.

903: The second PE sends the ICMP response packet to a third PE.

After the second PE encapsulates the ICMP response packet with a VXLAN header, the second PE commands unicast routing to send the ICMP response packet to the third PE. In other words, an outbound interface of a route points to the third PE.

904: The third PE sends the ICMP response packet to another PE through a bypass VXLAN tunnel.

After the third PE receives the ICMP response packet, the third PE determines that the second destination IP address in the ICMP response packet is the IP address of the first CE, and that the third PE is not an initiator of the ICMP request packet. The third PE needs to discard the ICMP response packet, but to obtain a detection result, the third PE sends the ICMP response packet to another PE through the bypass VXLAN tunnel. Because a bypass VXLAN tunnel is established between the first PE and the third PE, the another PE includes the first PE. When a bypass VXLAN tunnel is established between only the first PE and the third PE, the first PE is the another PE.

905: The first PE determines the detection result based on the ICMP response packet.

The first PE may receive the ICMP response packet forwarded by the third PE. After the first PE receives the ICMP response packet, if the first PE determines, through comparison, that the second destination IP address in the ICMP response packet is the same as the IP address of the first CE, and the first PE is the initiator of the ICMP request packet, the first PE sends the ICMP response packet to the CPU for processing, and finally obtains the detection result.

The foregoing describes the packet detection method and the connectivity negotiation relationship establishment method in embodiments of this application. The following describes a packet detection apparatus and a connectivity negotiation relationship establishment apparatus in embodiments of this application.

Figure 10:
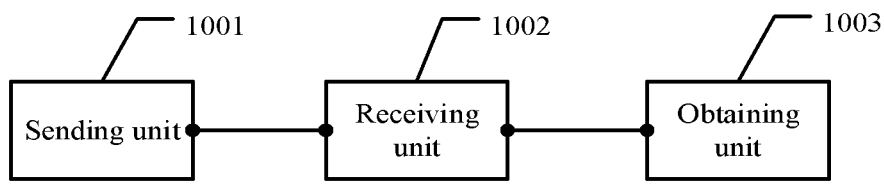
FIG. 10 is a schematic diagram of a structure of a packet detection apparatus according to an embodiment of this application.

Referring to FIG. 10, an embodiment of the packet detection apparatus in embodiments of this application includes a sending unit 1001 configured to send a detection packet to a second PE, where the detection packet is used to enable the second PE to generate a response packet, and the detection packet includes a bypass VXLAN tunnel source IP address; a receiving unit 1002 configured to receive, through a bypass VXLAN tunnel, a response packet for the detection packet, where the response packet includes the bypass VXLAN tunnel source IP address; and an obtaining unit 1003 configured to obtain a detection result from the response packet.

In this embodiment, an operation performed by each unit of the packet detection apparatus is similar to those described in the embodiment shown in FIG. 2. Details are not described herein again.

In this embodiment of this application, the sending unit 1001 sends the detection packet to the second PE. The detection packet is used to enable the second PE to generate the response packet, and the response packet includes the bypass VXLAN tunnel source IP address. Therefore, when a third PE receives the response packet and sends the response packet to the packet detection apparatus based on the bypass VXLAN tunnel source IP address, the receiving unit 1002 may receive, through the bypass VXLAN tunnel, the response packet that is sent by the third PE. Therefore, the obtaining unit 1003 may obtain the detection result based on the response packet.

Figure 11:
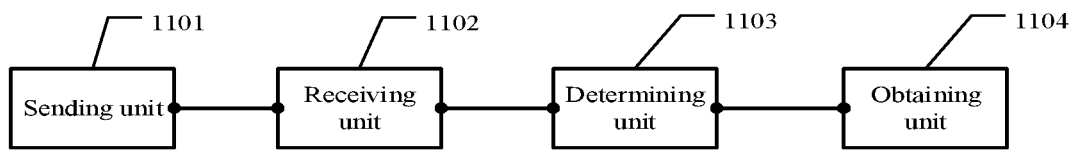
FIG. 11 is a schematic diagram of another structure of a packet detection apparatus according to an embodiment of this application.

Referring to FIG. 11, another embodiment of the packet detection apparatus in embodiments of this application includes a sending unit 1101 configured to send a detection packet to a second provider edge PE, where the detection packet is used to enable the second PE to generate a response packet, and the detection packet includes a bypass VXLAN tunnel source IP address; a receiving unit 1102 configured to receive, through a bypass VXLAN tunnel, a response packet for the detection packet, where the response packet includes the bypass VXLAN tunnel source IP address; and an obtaining unit 1104 configured to obtain a detection result from the response packet.

The packet detection apparatus in this embodiment further includes a determining unit 1103 configured to determine a first PE as a destination receiver of the response packet.

The obtaining unit 1104 is configured to obtain the detection result from the response packet when the first PE is determined as the receiver of the response packet.

The determining unit 1103 is configured to determine the first PE as the receiver of the response packet based on the bypass VXLAN tunnel source IP address in the response packet; or the determining unit 1103 is configured to determine the first PE as the receiver of the response packet based on a second destination IP address in the response packet. The second destination IP address is an IP address of a first CE.

In this embodiment, an operation performed by each unit of the packet detection apparatus is similar to those described in embodiments shown in FIG. 4 and FIG. 7. Details are not described herein again.

Figure 12:
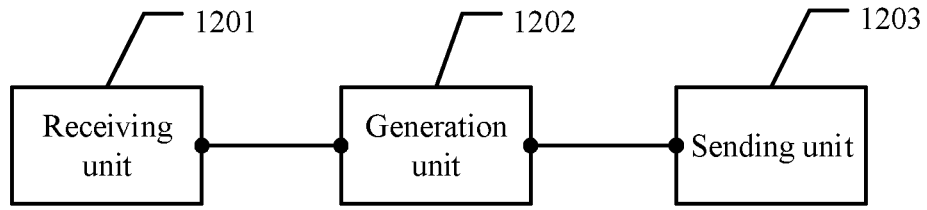
FIG. 12 is a schematic diagram of another structure of a packet detection apparatus according to an embodiment of this application.

Referring to FIG. 12, another embodiment of the packet detection apparatus in embodiments of this application includes a receiving unit 1201 configured to receive a detection packet sent by a first PE, where the detection packet includes a bypass virtual extensible local area network bypass VXLAN tunnel source IP address; a generation unit 1202 configured to generate a response packet based on the detection packet, where the response packet includes the bypass VXLAN tunnel source IP address; and a sending unit 1203 configured to send the response packet.

In this embodiment of this application, the receiving unit 1201 receives the detection packet sent by the first PE. The detection packet includes the bypass VXLAN tunnel source IP address. The generation unit 1202 generates the response packet based on the detection packet. The response packet includes the bypass VXLAN tunnel source IP address. The sending unit 1203 sends the response packet. Therefore, when another PE receives the response packet and sends the response packet to the first PE based on the bypass VXLAN tunnel source IP address, the first PE may receive, through the bypass VXLAN tunnel, the response packet that is sent by the third PE. Therefore, the first PE may obtain a detection result based on the response packet.

In this embodiment, an operation performed by each unit of the packet detection apparatus is similar to those described in embodiments shown in FIG. 4 and FIG. 7. Details are not described herein again.

Referring to FIG. 12, another embodiment of the packet detection apparatus in embodiments of this application includes a receiving unit 1201 configured to receive a detection packet sent by a first PE, where the detection packet includes a bypass virtual extensible local area network bypass VXLAN tunnel source IP address; a generation unit 1202 configured to generate a response packet based on the detection packet, where the response packet includes the bypass VXLAN tunnel source IP address; and a sending unit 1203 configured to send the response packet.

The packet detection apparatus in this embodiment further includes the sending unit 1203 sends the response packet to the first PE or a third PE based on an anycast mechanism.

The detection packet and the response packet each are a VXLAN packet.

The detection packet includes a first source IP address and a first destination IP address, the first source IP address is an IP address of a first customer edge CE, the first destination IP address is an IP address of a second CE, the response packet includes a second source IP address and a second destination IP address, the second source IP address is the IP address of the second CE, and the second destination IP address is the IP address of the first CE.

In this embodiment, an operation performed by each unit of the packet detection apparatus is similar to those described in embodiments shown in FIG. 4 and FIG. 7. Details are not described herein again.

Figure 13:
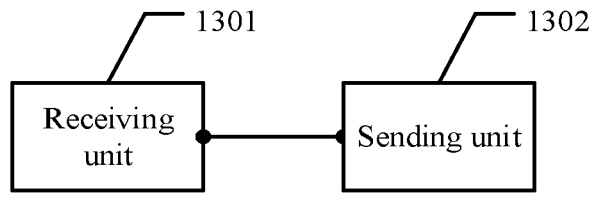
FIG. 13 is a schematic diagram of another structure of a packet detection apparatus according to an embodiment of this application.

Referring to FIG. 13, another embodiment of the packet detection apparatus in embodiments of this application includes a receiving unit 1301 configured to receive a response packet sent by a second PE; and a sending unit 1302 configured to send the response packet to N other PEs through N bypass virtual extensible local area network bypass VXLAN tunnels when it is determined that a destination receiver of the response packet is a device different from the packet detection apparatus, where N is an integer greater than or equal to 1.

In this embodiment, the receiving unit 1301 receives the response packet sent by the second PE. Although a second destination IP address in the response packet is an IP address of a first CE, and a communication connection is established between the first CE and a third PE, the third PE is not an initiator of a detection packet, and the third PE needs to discard the response packet, but the packet detection apparatus does not discard the response packet, and instead, the sending unit 1302 sends the response packet to another PE that establishes a bypass VXLAN tunnel to the third PE. When the N other PEs establish a bypass VXLAN tunnel to the third PE, the third PE sends the response packet to the N other PEs through the N bypass VXLAN tunnels. Because a bypass VXLAN tunnel is established between a first PE and the third PE, the response packet may be used by the first PE to obtain a detection result.

In this embodiment, an operation performed by each unit of the packet detection apparatus is similar to those described in the embodiment shown in FIG. 9. Details are not described herein again.

Figure 14:
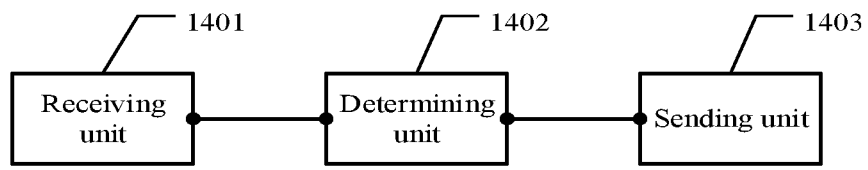
FIG. 14 is a schematic diagram of another structure of a packet detection apparatus according to an embodiment of this application.

Referring to FIG. 14, another embodiment of the packet detection apparatus in embodiments of this application includes a receiving unit 1401 configured to receive a response packet sent by a second PE, where the response packet includes a bypass virtual extensible local area network bypass VXLAN tunnel source IP address; a determining unit 1402 configured to determine a bypass VXLAN tunnel based on the bypass VXLAN tunnel IP address; and a sending unit 1403 configured to send the response packet to a first PE through the bypass VXLAN tunnel.

In this embodiment, the receiving unit 1401 receives the response packet sent by the second PE, but the packet detection apparatus is not a destination receiver of the response packet. The packet detection apparatus needs to discard the response packet, but the packet detection apparatus does not discard the response packet, and instead, the determining unit 1402 determines the bypass VXLAN tunnel based on the bypass VXLAN tunnel IP address in the response packet, and then the sending unit 1403 sends the response packet to the first PE through the bypass VXLAN tunnel. Because the response packet carries the bypass VXLAN tunnel IP address and a bypass VXLAN tunnel is established between the first PE and the packet detection apparatus, the packet detection apparatus may send the response packet to the first PE. Therefore, the response packet may be used by the first PE to obtain a detection result.

In this embodiment, an operation performed by each unit of the packet detection apparatus is similar to those described in embodiments shown in FIG. 4 and FIG. 7. Details are not described herein again.

Referring to FIG. 14, another embodiment of the packet detection apparatus in embodiments of this application includes a receiving unit 1401 configured to receive a response packet sent by a second PE, where the response packet includes a bypass virtual extensible local area network bypass VXLAN tunnel source IP address; a determining unit 1402 configured to determine a bypass VXLAN tunnel based on the bypass VXLAN tunnel IP address; and a sending unit 1403 configured to send the response packet to a first PE through the bypass VXLAN tunnel.

The packet detection apparatus in this embodiment further includes that the response packet includes a second destination IP address, the second destination IP address is used by the first PE to determine a detection result, and the second destination IP address is an IP address of a first CE.

The bypass VXLAN tunnel IP address is used by the first PE to determine the detection result.

In this embodiment, an operation performed by each unit of the packet detection apparatus is similar to those described in embodiments shown in FIG. 4 and FIG. 7. Details are not described herein again.

Figure 15:
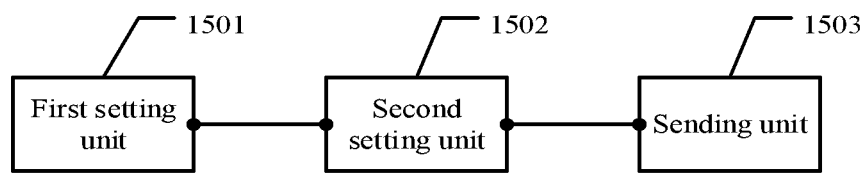
FIG. 15 is a schematic diagram of a structure of a connectivity negotiation relationship establishment apparatus according to an embodiment of this application.

Referring to FIG. 15, an embodiment of the connectivity negotiation relationship establishment apparatus in embodiments of this application includes a first setting unit 1501 configured to set a state of a first enabling switch to a first state, where a bypass virtual extensible local area network bypass VXLAN tunnel is established between a first PE and a third PE; a second setting unit 1502 configured to set, by the first PE, a value of a C bit based on the first state; and a sending unit 1503 configured to send a route and the C bit to the third PE.

In this embodiment, the sending unit 1503 sends the route and the C bit to the third PE, to establish a connectivity negotiation relationship, and a bypass virtual extensible local area network bypass VXLAN tunnel is established between the connectivity negotiation relationship establishment apparatus and the third PE. However, in some cases, an information exchange between the connectivity negotiation relationship establishment apparatus and the third PE is not smooth. According to the connectivity negotiation relationship establishment method in embodiments of this application, the information exchange between the connectivity negotiation relationship establishment apparatus and the third PE can be enhanced.

In this embodiment, an operation performed by each unit of the connectivity negotiation relationship establishment apparatus is similar to those described in embodiments shown in FIG. 4 and FIG. 7. Details are not described herein again.

Referring to FIG. 15, another embodiment of the connectivity negotiation relationship establishment apparatus in embodiments of this application includes a first setting unit 1501 configured to set a state of a first enabling switch to a first state, where a bypass virtual extensible local area network bypass VXLAN tunnel is established between a first PE and a third PE; a second setting unit 1502 configured to set, by the first PE, a value of a C bit based on the first state; and a sending unit 1503 configured to send a route and the C bit to the third PE.

The connectivity negotiation relationship establishment apparatus in this embodiment further includes that the bypass VXLAN tunnel is a bypass layer 3 VXLAN tunnel; the route is a type 5 route, and an IP address that is of the first PE and that is carried in the type 5 route is 0; the bypass VXLAN tunnel is a bypass layer 2 VXLAN tunnel; and the route is a type 3 route.

In this embodiment, an operation performed by each unit of the connectivity negotiation relationship establishment apparatus is similar to those described in embodiments shown in FIG. 4 and FIG. 7. Details are not described herein again.

Figure 16:
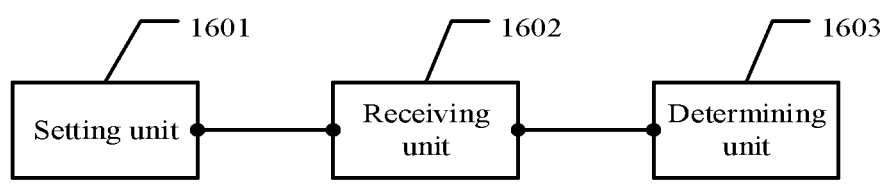
FIG. 16 is a schematic diagram of another structure of a connectivity negotiation relationship establishment apparatus according to an embodiment of this application.

Referring to FIG. 16, another embodiment of the connectivity negotiation relationship establishment apparatus in embodiments of this application includes a setting unit 1601 configured to set a state of a second enabling switch to a first state, where a bypass VXLAN tunnel is established between a third PE and a first PE; a receiving unit 1602 configured to receive a route and a C bit of an active-active extended community attribute that are sent by the first PE; and a determining unit 1603 configured to, if the state of the second enabling switch is the first state, the route matches a target route of the third PE, and a value of the C bit is set, determine that a connectivity negotiation relationship is successfully established.

In this embodiment, the receiving unit 1602 receives the route and the C bit that are sent by the first PE, to establish the connectivity negotiation relationship. A bypass virtual extensible local area network bypass VXLAN tunnel is established between the connectivity negotiation relationship establishment apparatus and the first PE. However, in some cases, an information exchange between the connectivity negotiation relationship establishment apparatus and the third PE is not smooth. According to the connectivity negotiation relationship establishment method in embodiments of this application, the information exchange between the connectivity negotiation relationship establishment apparatus and the third PE can be enhanced.

In this embodiment, an operation performed by each unit of the connectivity negotiation relationship establishment apparatus is similar to those described in embodiments shown in FIG. 4 and FIG. 7. Details are not described herein again.

Referring to FIG. 16, another embodiment of the connectivity negotiation relationship establishment apparatus in embodiments of this application includes a setting unit 1601 configured to set a state of a second enabling switch to a first state, where a bypass VXLAN tunnel is established between a third PE and a first PE; a receiving unit 1602 configured to receive a route and a C bit of an active-active extended community attribute that are sent by the first PE; and a determining unit 1603 configured to, if the state of the second enabling switch is the first state, the route matches a target route of the third PE, and a value of the C bit is set, determine that a connectivity negotiation relationship is successfully established.

The connectivity negotiation relationship establishment apparatus in this embodiment further includes the bypass VXLAN tunnel is a bypass layer 3 VXLAN tunnel; the route is a type 5 route, and an IP address that is of the first PE and that is carried in the type 5 route is 0; the bypass VXLAN tunnel is a bypass layer 2 VXLAN tunnel; and the route is a type 3 route.

In this embodiment, an operation performed by each unit of the connectivity negotiation relationship establishment apparatus is similar to those described in embodiments shown in FIG. 4 and FIG. 7. Details are not described herein again.

Figure 17:
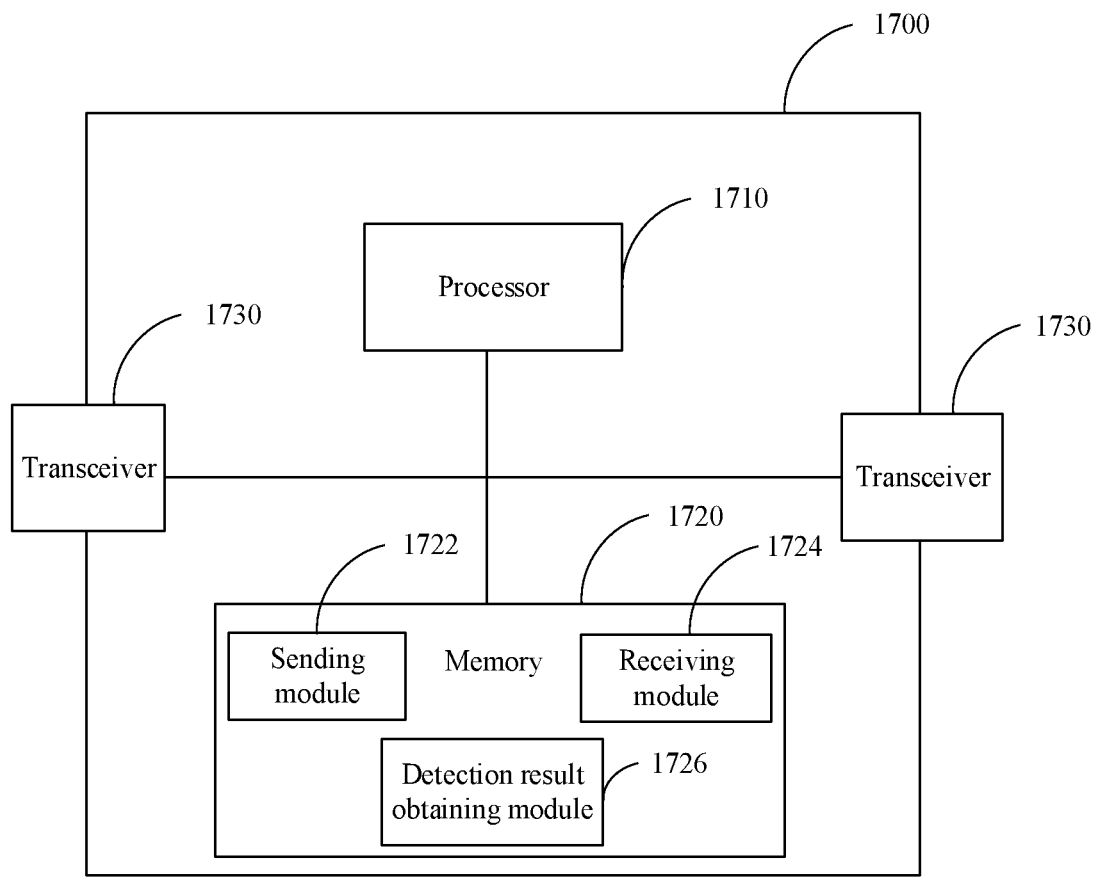
FIG. 17 is a schematic diagram of a structure of a packet detection device according to an embodiment of this application.

Referring to FIG. 17, an embodiment of a packet detection device 1700 in embodiments of this application includes the following content.

As shown in FIG. 17, the packet detection device 1700 includes a processor 1710 and a memory 1720 and a transceiver 1730 that are coupled to the processor 1710. The packet detection device 1700 may be the first PE in FIG. 1, FIG. 4, and FIG. 7. The processor 1710 may be a CPU, a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 1710 may be one processor, or may include a plurality of processors. The memory 1720 may include a volatile memory, for example, a random-access memory (RAM). The memory may alternatively include a non-volatile memory, for example, a read-only memory (ROM), a flash memory, a hard disk drive (HDD), or a solid-state drive (SSD). The memory may alternatively include a combination of the foregoing memories. The memory 1720 stores computer-readable instructions. The computer-readable instructions include a plurality of software modules such as a sending module 1722, a receiving module 1724, and a detection result obtaining module 1726. After executing each software module, the processor 1710 may perform a corresponding operation based on an indication of each software module. In this embodiment, an operation performed by a software module is actually an operation performed by the processor 1710 based on an indication of the software module. The sending module 1722 may be configured to send a detection packet to a second PE. The detection packet is used to enable the second PE to generate a response packet, and the detection packet includes a bypass virtual extensible local area network bypass VXLAN tunnel source IP address. The receiving module 1724 is configured to receive, through a bypass VXLAN tunnel, a response packet for the detection packet. The response packet includes the bypass VXLAN tunnel source IP address. The detection result obtaining module 1726 obtains a detection result from the response packet. In addition, after executing the computer-readable instructions in the memory 1720, the processor 1710 may perform, based on an indication of the computer-readable instructions, all operations that can be performed by the first PE, for example, operations performed by the first PE in embodiments corresponding to FIG. 4 and FIG. 7.

Figure 18:
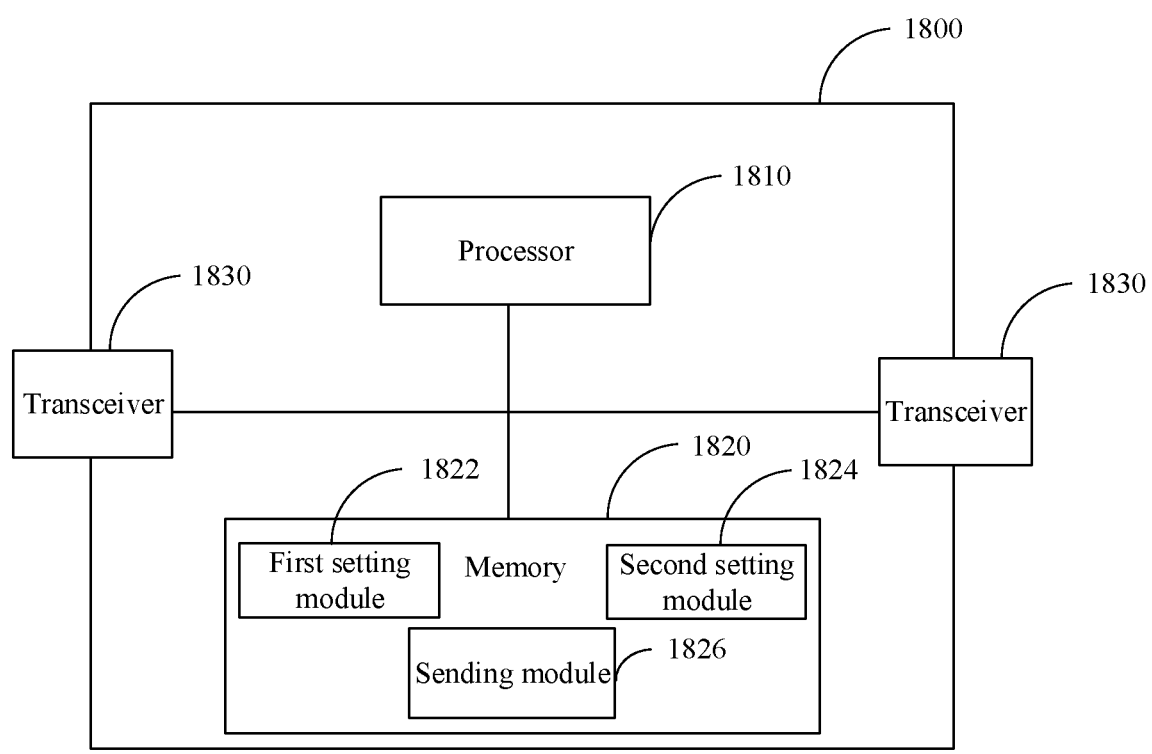
FIG. 18 is a schematic diagram of a structure of a connectivity negotiation relationship establishment device according to an embodiment of this application.

Referring to FIG. 18, an embodiment of a connectivity negotiation relationship establishment device 1800 in embodiments of this application includes the following content.

As shown in FIG. 18, the connectivity negotiation relationship establishment device 1800 includes a processor 1810 and a memory 1820 and a transceiver 1830 that are coupled to the processor 1810. The connectivity negotiation relationship establishment device 1800 may be the first PE in FIG. 1, FIG. 4, and FIG. 7. The processor 1810 may be a CPU, a NP, or a combination of a CPU and an NP. Alternatively, the processor may be an ASIC, a PLD, or a combination thereof. The PLD may be a CPLD, an FPGA, a GAL, or any combination thereof. The processor 1810 may be one processor, or may include a plurality of processors. The memory 1820 may include a volatile memory, for example, a RAM. The memory may alternatively include a non-volatile memory, for example, a ROM, a flash memory, a HDD, or a SSD. The memory may alternatively include a combination of the foregoing memories. The memory 1820 stores computer-readable instructions. The computer-readable instructions include a plurality of software modules such as a first setting module 1822, a second setting module 1824, and a sending module 1826. After executing each software module, the processor 1810 may perform a corresponding operation based on an indication of each software module. In this embodiment, an operation performed by a software module is actually an operation performed by the processor 1810 based on an indication of the software module. The first setting module 1822 may be configured to set a state of a first enabling switch to a first state. A bypass virtual extensible local area network bypass VXLAN tunnel is established between the first PE and a third PE. The second setting module 1824 is configured to set a value of a C bit of an active-active extended community attribute based on the first state. The sending module 1826 sends a route and the C bit to the third PE. In addition, after executing the computer-readable instructions in the memory 1810, the processor 1820 may perform, based on an indication of the computer-readable instructions, all operations that can be performed by the first PE, for example, operations performed by the first PE in embodiments corresponding to FIG. 4 and FIG. 7.

Figure 19:
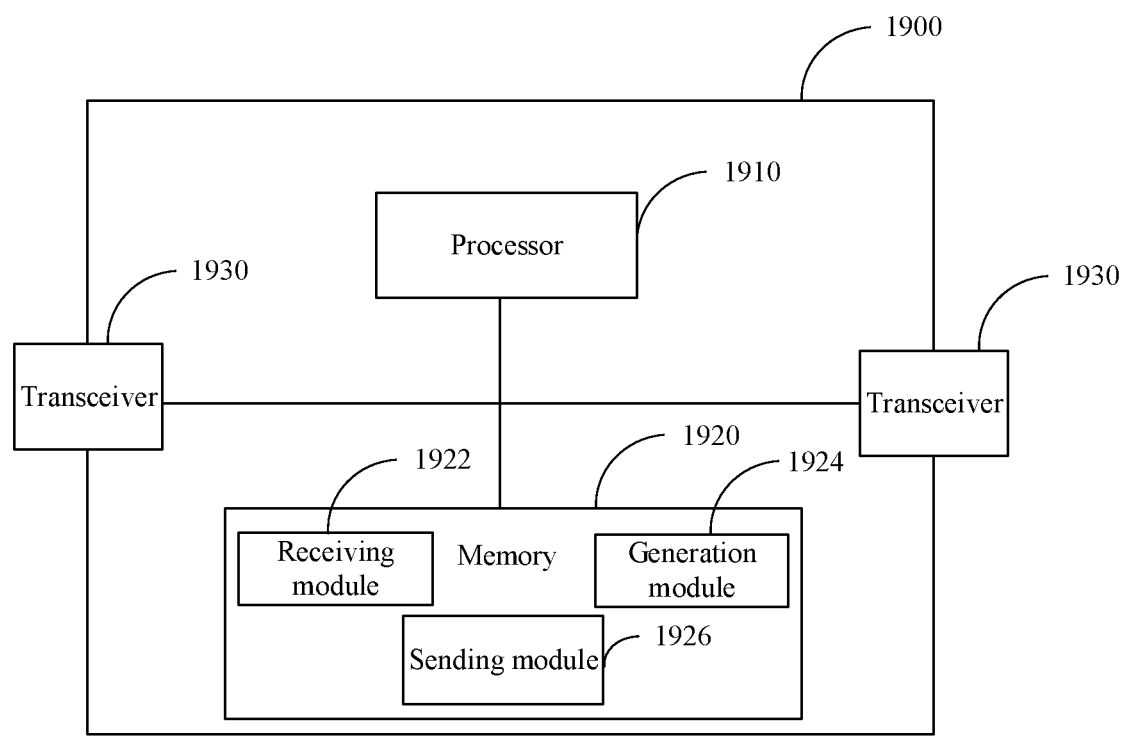
FIG. 19 is a schematic diagram of another structure of a packet detection device according to an embodiment of this application.

Referring to FIG. 19. Another embodiment of a packet detection device 1900 in embodiments of this application includes the following content:

As shown in FIG. 19, the packet detection device 1900 includes a processor 1910 and a memory 1920 and a transceiver 1930 that are coupled to the processor 1910. The packet detection device 1900 may be the second PE in FIG. 1, FIG. 4, and FIG. 7. The processor 1910 may be CPU, a NP, or a combination of a CPU and an NP. Alternatively, the processor may be an ASIC, a PLD, or a combination thereof. The PLD may be a CPLD, a FPGA, a GAL, or any combination thereof The processor 1910 may be one processor, or may include a plurality of processors. The memory 1920 may include a volatile memory, for example, a RAM. The memory may alternatively include a non-volatile memory, for example, a ROM, a flash memory, a HDD, or a SSD. The memory may alternatively include a combination of the foregoing memories. The memory 1920 stores computer-readable instructions. The computer-readable instructions include a plurality of software modules such as a receiving module 1922, a generation module 1924, and a sending module 1926. After executing each software module, the processor 1910 may perform a corresponding operation based on an indication of each software module. In this embodiment, an operation performed by a software module is actually an operation performed by the processor 1910 based on an indication of the software module. The receiving module 1922 may be configured to receive a detection packet sent by a first PE. The detection packet includes a bypass virtual extensible local area network bypass VXLAN tunnel source IP address. The generation unit 1924 is configured to generate a response packet based on the detection packet. The response packet includes the bypass VXLAN tunnel source IP address. The sending module 1926 is configured to send the response packet. In addition, after executing the computer-readable instructions in the memory 1910, the processor 1920 may perform, based on an indication of the computer-readable instructions, all operations that can be performed by the second PE, for example, operations performed by the second PE in embodiments corresponding to FIG. 4 and FIG. 7.

Figure 20:
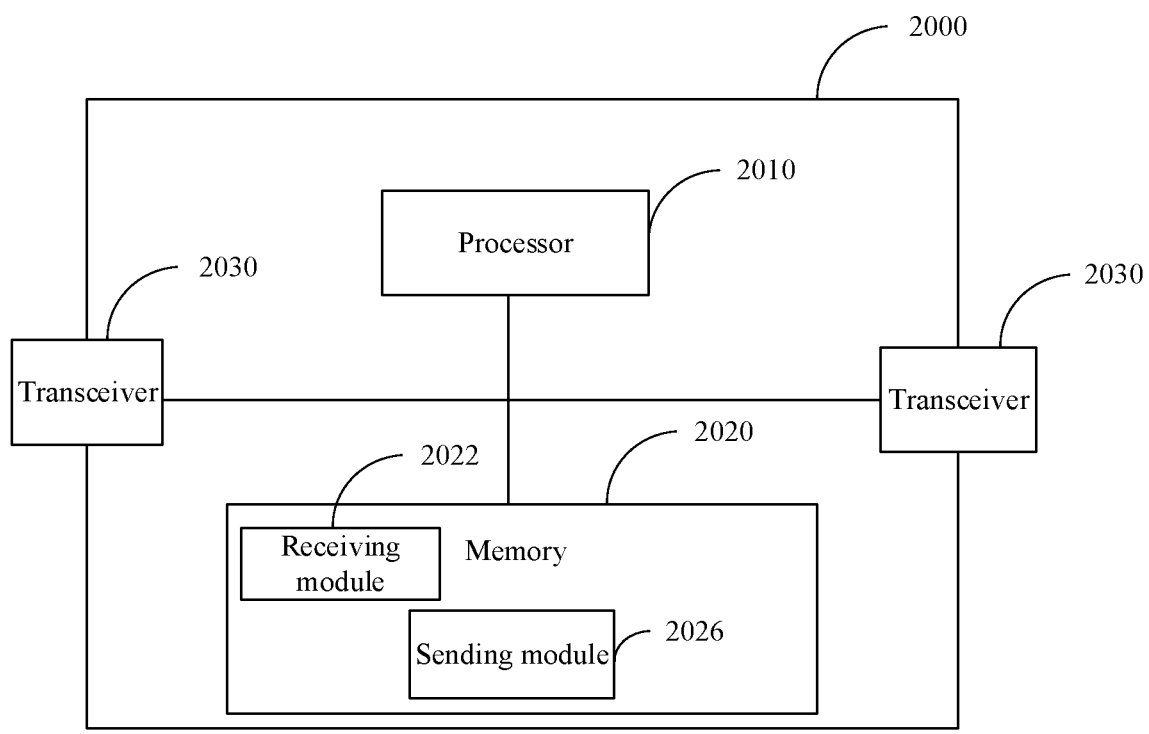
FIG. 20 is a schematic diagram of another structure of a packet detection device according to an embodiment of this application.

Referring to FIG. 20, another embodiment of a packet detection device 2000 in embodiments of this application includes the following content:

As shown in FIG. 20, the packet detection device 2000 includes a processor 2010 and a memory 2020 and a transceiver 2030 that are coupled to the processor 2010. The packet detection device 2000 may be the third PE in FIG. 1 and FIG. 9. The processor 2010 may be a CPU, a NP, or a combination of a CPU and an NP. Alternatively, the processor may be an ASIC, a PLD, or a combination thereof. The PLD may be a CPLD, an FPGA, a GAL, or any combination thereof. The processor 2010 may be one processor, or may include a plurality of processors. The memory 2020 may include a volatile memory, for example, a RAM. The memory may alternatively include a non-volatile memory, for example, a ROM, a flash memory, a HDD, or a SSD. The memory may alternatively include a combination of the foregoing memories. The memory 2020 stores computer-readable instructions. The computer-readable instructions include a plurality of software modules such as a receiving module 2022 and a sending module 2026. After executing each software module, the processor 2010 may perform a corresponding operation based on an indication of each software module. In this embodiment, an operation performed by a software module is actually an operation performed by the processor 2010 based on an indication of the software module. The receiving module 2022 may be configured to receive a response packet sent by a second PE. The sending module 2026 is configured to send the response packet to N other PEs through N bypass virtual extensible local area network bypass VXLAN tunnels when it is determined that a destination receiver of the response packet is a device different from the packet detection device 2000, where N is an integer greater than or equal to 1. In addition, after executing the computer-readable instructions in the memory 2020, the processor 2010 may perform, based on an indication of the computer-readable instructions, all operations that can be performed by the third PE, for example, operations performed by the third PE in the embodiment corresponding to FIG. 9.

Figure 21:
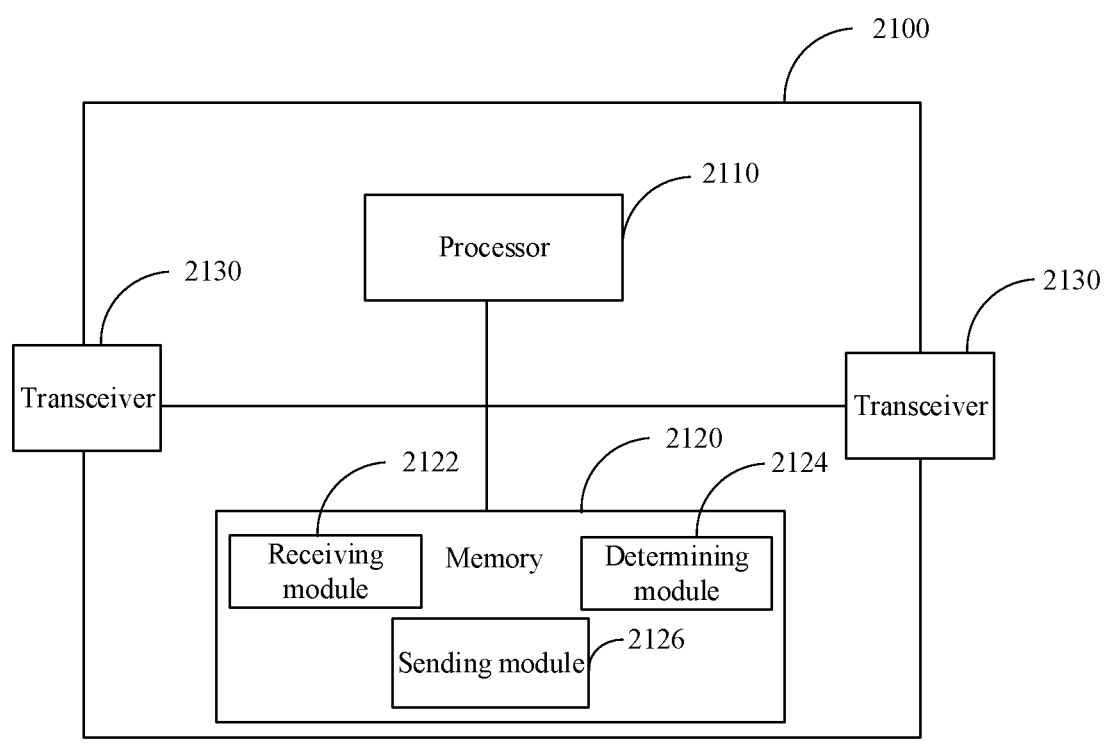
FIG. 21 is a schematic diagram of another structure of a packet detection device according to an embodiment of this application.

Referring to FIG. 21, another embodiment of a packet detection device 2100 in embodiments of this application includes the following content.

As shown in FIG. 21, the packet detection device 2100 includes a processor 2110 and a memory 2121 and a transceiver 2130 that are coupled to the processor 2110. The packet detection device 2100 may be the third PE in FIG. 1, FIG. 4, and FIG. 7. The processor 2110 may be a CPU, a NP, or a combination of a CPU and an NP. Alternatively, the processor may be an ASIC, a PLD, or a combination thereof. The PLD may be a CPLD, an FPGA, a GAL, or any combination thereof. The processor 2110 may be one processor, or may include a plurality of processors. The memory 2121 may include a volatile memory, for example, a RAM. The memory may alternatively include a non-volatile memory, for example, a ROM, a flash memory, a HDD, or a SSD. The memory may alternatively include a combination of the foregoing memories. The memory 2121 stores computer-readable instructions. The computer-readable instructions include a plurality of software modules such as a receiving module 2122, a determining module 2124, and a sending module 2126. After executing each software module, the processor 2110 may perform a corresponding operation based on an indication of each software module. In this embodiment, an operation performed by a software module is actually an operation performed by the processor 2110 based on an indication of the software module. The receiving module 2122 may receive a response packet sent by a second PE. The response packet includes a bypass virtual extensible local area network bypass VXLAN tunnel source IP address. The determining module 2124 is configured to determine a bypass VXLAN tunnel based on a bypass VXLAN tunnel IP address. The sending module 2126 is configured to send the response packet to the first PE through the bypass VXLAN tunnel. In addition, after executing the computer-readable instructions in the memory 2121, the processor 2110 may perform, based on an indication of the computer-readable instructions, all operations that can be performed by the third PE, for example, operations performed by the third PE in embodiments corresponding to FIG. 4 and FIG. 7.

Figure 22:
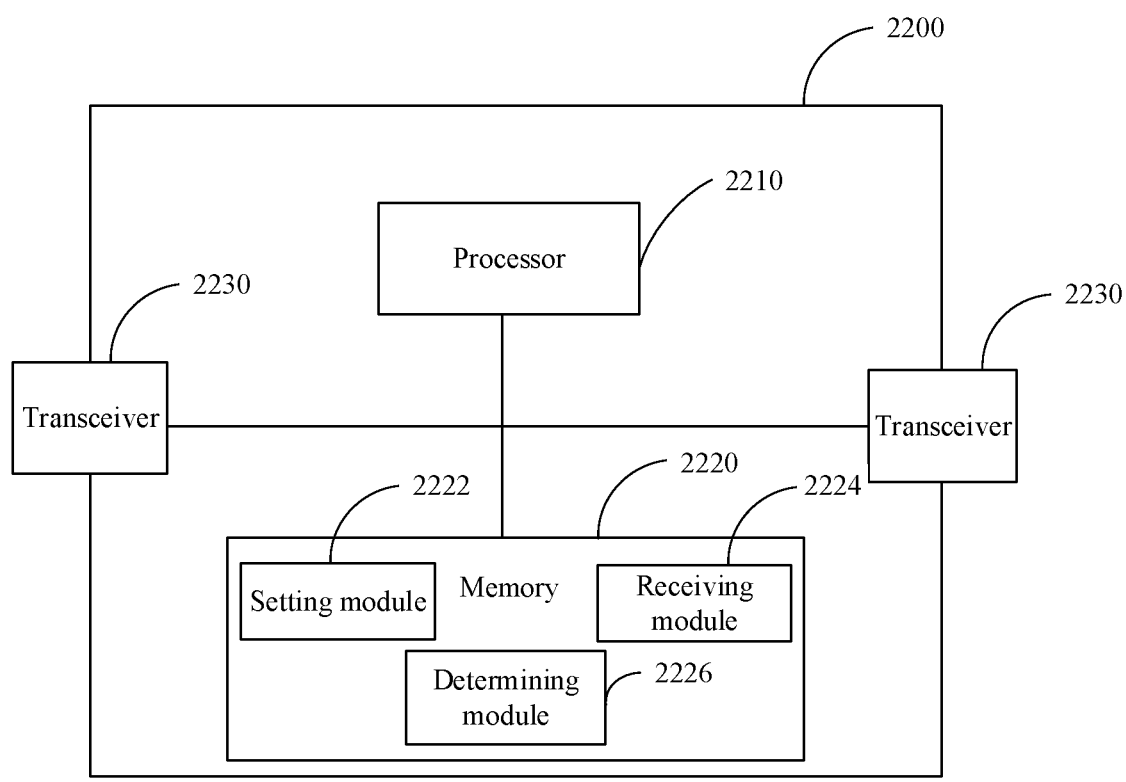
FIG. 22 is a schematic diagram of another structure of a connectivity negotiation relationship establishment device according to an embodiment of this application.

Referring to FIG. 22, another embodiment of a connectivity negotiation relationship establishment device 2200 in embodiments of this application includes the following content.

As shown in FIG. 22, the connectivity negotiation relationship establishment device 2200 includes a processor 2210 and a memory 2220 and a transceiver 2230 that are coupled to the processor 2210. The connectivity negotiation relationship establishment device 2200 may be the third PE in FIG. 1, FIG. 4, and FIG. 7. The processor 2210 may be a CPU, a NP, or a combination of a CPU and an NP. Alternatively, the processor may be an ASIC, a PLD, or a combination thereof. The PLD may be a CPLD, an FPGA, a GAL, or any combination thereof. The processor 2210 may be one processor, or may include a plurality of processors. The memory 2220 may include a volatile memory, for example, a RAM. The memory may alternatively include a non-volatile memory, for example, a ROM, a flash memory, a HDD, or a SSD. The memory may alternatively include a combination of the foregoing memories. The memory 2220 stores computer-readable instructions. The computer-readable instructions include a plurality of software modules such as a setting module 2222, a receiving module 2224, and a determining module 2226. After executing each software module, the processor 2210 may perform a corresponding operation based on an indication of each software module. In this embodiment, an operation performed by a software module is actually an operation performed by the processor 2210 based on an indication of the software module. The setting module 2222 may be configured to set a state of a second enabling switch to a first state. A bypass virtual extensible local area network bypass VXLAN tunnel is established between the third PE and a first PE. The receiving module 2224 is configured to receive a route and a C bit of an active-active extended community attribute that are sent by the first PE. If the state of the second enabling switch is the first state, the route matches a target route of the third PE, and a value of the C bit is set, the determining module 2226 determines that the connectivity negotiation relationship is successfully established. In addition, after executing the computer-readable instructions in the memory 2220, the processor 2210 may perform, based on an indication of the computer-readable instructions, all operations that can be performed by the third PE, for example, operations performed by the third PE in embodiments corresponding to FIG. 4 and FIG. 7.

In the several embodiments provided in this application, it should be understood that the disclosed system, device, and method may be implemented in other manners. For example, the described device embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to a current technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

What is claimed is:

1. A packet detection apparatus, applied to a first provider edge (PE) and comprising:
   a processor; and
   a memory coupled to the processor and configured to store instructions that, when executed by the processor, cause the packet detection apparatus to be configured to:
   send a detection packet to a second PE, wherein the detection packet comprises a virtual extensible local area network (VXLAN) tunnel source Internet Protocol (IP) address;
   receive, through a VXLAN tunnel, a response packet in response to the detection packet, wherein the response packet comprises the VXLAN tunnel source IP address;
   determine the first PE as a destination receiver of the response packet based on the VXLAN tunnel source IP address in the response packet or based on a second destination IP address in the response packet, wherein the second destination IP address is an IP address of a first customer edge (CE); and
   obtain a detection result from the response packet.

2. The packet detection apparatus of claim 1, wherein the detection packet is an Internet Control Message Protocol (ICMP) request packet, and wherein the response packet is an ICMP response packet.

3. The packet detection apparatus of claim 1, wherein the detection packet is a 2544 request packet, and wherein the response packet is a 2544 response packet.

4. The packet detection apparatus of claim 1, wherein the detection packet further comprises a first source IP address and a first destination IP address, wherein the first source IP address is a first IP address of the first CE, wherein the first destination IP address is second IP address of a second CE, wherein the response packet comprises a second source IP address and the second destination IP address, wherein the second source IP address is the second IP address, and wherein the second destination IP address is the first IP address.

5. The packet detection apparatus of claim 1, wherein the first PE is further configured to receive the response packet from the second PE.

6. The packet detection apparatus of claim 1, wherein the detection packet and the response packet are both VXLAN packets.

7. A packet processing apparatus, applied to a second provider edge (PE) and comprising:
   a processor; and
   a memory coupled to the processor and storing instructions that, when executed by the processor, cause the packet processing apparatus to be configured to:
   receive a detection packet from a first PE, wherein the detection packet comprises a virtual extensible local area network (VXLAN) tunnel source Internet Protocol (IP) address; and
   send a response packet in response to the detection packet, wherein the response packet comprises the VXLAN tunnel source IP address and a second destination IP address of a first customer edge (CE), and wherein the response packet enables the first PE to determine the first PE as a destination receiver of the response packet based on the VXLAN tunnel source IP address or based on the second destination IP address in the response packet, wherein the second destination IP address is an IP address.

8. The packet processing apparatus of claim 7, wherein the instructions further cause the packet processing apparatus to further send the response packet to the first PE.

9. The packet processing apparatus of claim 7, wherein the instructions further cause the packet processing apparatus to further send the response packet to a third PE based on anycast transmission.

10. The packet processing apparatus of claim 7, wherein the detection packet and the response packet are both VXLAN packets.

11. The packet processing apparatus of claim 7, wherein the detection packet comprises a first source IP address and a first destination IP address, wherein the first source IP address is a first IP address of a first customer edge CE, wherein the first destination IP address is second IP address of a second CE, wherein the response packet comprises a second source IP address and the second destination IP address, wherein the second source IP address is the second IP address, and wherein the second destination IP address is the first IP address.

12. The packet processing apparatus of claim 7, wherein the detection packet is an Internet Control Message Protocol (ICMP) request packet and the response packet is an ICMP response packet or wherein the detection packet is a 2544 request packet and the response packet is a 2544 response packet.

13. A system, comprising:
a first provider edge, PE configured to:
send a detection packet, wherein the detection packet comprises a virtual extensible local area network (VXLAN) tunnel source Internet Protocol (IP) address;
receive, through a VXLAN tunnel, a response packet for the detection packet, wherein the response packet comprises the VXLAN tunnel source IP address;
determine the first PE as a destination receiver of the response packet based on the VXLAN tunnel source IP address in the response packet or based on a second destination IP address in the response packet, wherein the second destination IP address is an IP address of a first customer edge (CE); and
obtain a detection result from the response packet; and
a second provider edge configured to:
receive the detection packet; and
send the response packet.

14. The system of claim 13, wherein the detection packet is an Internet Control Message Protocol (ICMP) request packet, and wherein the response packet is an ICMP response packet.

15. The system of claim 13, wherein the detection packet is a 2544 request packet, and wherein the response packet is a 2544 response packet.

16. The system of claim 13, wherein the detection packet comprises a first source IP address and a first destination IP address, wherein the first source IP address is a first IP address of a first customer edge CE, wherein the first destination IP address is second IP address of a second CE, wherein the response packet comprises a second source IP address and a second destination IP address, wherein the second source IP address is the second IP address, and wherein the second destination IP address is the first IP address.

17. The system of claim 13, wherein the first PE is further configured to receive the response packet from the second PE.

18. The system of claim 13, wherein the second PE is further configured to send the response packet to the first PE.

19. The system of claim 13, wherein the second PE is further configured to send the response packet to a third PE.

* * * * *